United States Patent
Li et al.

(10) Patent No.: US 8,270,545 B2
(45) Date of Patent: Sep. 18, 2012

(54) METHODS AND SYSTEMS USING FINE FREQUENCY TRACKING LOOP DESIGN FOR WIMAX

(75) Inventors: Junqiang Li, Sunnyvale, CA (US); Madihally J. Narasimha, Saratoga, CA (US); Je Woo Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 12/395,675

(22) Filed: Mar. 1, 2009

(65) Prior Publication Data

US 2010/0220819 A1    Sep. 2, 2010

(51) Int. Cl.
H04L 27/06    (2006.01)

(52) U.S. Cl. ........ 375/344; 375/260; 375/267; 375/299; 375/316; 375/324; 375/326; 375/343; 375/347; 375/354; 375/362; 375/371; 455/101; 455/132; 455/296; 455/500; 455/502; 455/516; 370/210; 370/334; 370/503; 370/508; 370/509; 370/510; 370/511; 370/512; 370/513; 370/514; 370/516

(58) Field of Classification Search ........... 375/260, 375/267, 299, 316, 324, 326, 343, 344, 347, 375/354, 362, 371; 455/101, 132, 296, 500, 455/562.1, 502, 516; 370/210, 334, 503, 370/508, 509, 510, 511, 512, 513, 514, 516
See application file for complete search history.

(56) References Cited

U.S. PATENT DOCUMENTS

| | | | |
|---|---|---|---|
| 7,564,927 B2 * | 7/2009 | Wu et al. | 375/326 |
| 7,769,119 B2 * | 8/2010 | Chun et al. | 375/354 |
| 2008/0273641 A1 * | 11/2008 | Yang et al. | 375/359 |
| 2009/0080576 A1 | 3/2009 | Xiang | |
| 2010/0008216 A1 * | 1/2010 | Li et al. | 370/208 |

FOREIGN PATENT DOCUMENTS

GB    2364868    2/2002

OTHER PUBLICATIONS

International Search Report and Written Opinion—PCT/US2010/025419, International Search Authority—European Patent Office—Jun. 24, 2010.
Moose, "A Technique for orthogonal Frequency Division Multiplexing Frequency Offset Correction", IEEE Transactions on Communications, Oct. 1994, pp. 2908-2914, vol. 42 No. 10.
Speth, Michael et al., "Optimum Receiver Design for Wireless Broad-Band Systems Using OFDM, Part 1", IEEE transaction on communications, 1999, 47 (11), 1668-1677.

* cited by examiner

*Primary Examiner* — Leon Flores
(74) *Attorney, Agent, or Firm* — Charles Chesney

(57) ABSTRACT

Certain embodiments of the present disclosure relate to a method for tracking of a carrier frequency offset. A soft combined frequency tracking discriminator is proposed as a part of the closed loop structure that can provide fast tracking of the frequency offset in an initial pull-in mode, and can also track small residual frequency variance in a fine-tracking mode.

48 Claims, 24 Drawing Sheets

US 8,270,545 B2

METHODS AND SYSTEMS USING FINE FREQUENCY TRACKING LOOP DESIGN FOR WIMAX

TECHNICAL FIELD

Certain embodiments of the present disclosure generally relate to a wireless communication and, more particularly, to a method for tracking of a carrier frequency offset.

SUMMARY

Certain embodiments of the present disclosure provide a method for a wireless communication system. The method generally includes correlating pilots from a pair of consecutive symbols with same pilot pattern to obtain a first estimated value of a frequency offset, determining a weighting factor based on the first estimated value of the frequency offset, correlating pilots from one or more pair of symbols with same pilot pattern to obtain a set of estimated values of the frequency offset, where symbols in each pair are spaced apart by at least one symbol period, averaging estimated values of the frequency offset from the set of estimated values to obtain a second estimated value of the frequency offset, and computing a third estimated value of the frequency offset by using the first estimated value of frequency offset, the second estimated value of frequency offset and the weighting factor.

Certain embodiments of the present disclosure provide an apparatus for a wireless communication system. The apparatus generally includes logic for correlating pilots from a pair of consecutive symbols with same pilot pattern to obtain a first estimated value of a frequency offset, logic for determining a weighting factor based on the first estimated value of the frequency offset, logic for correlating pilots from one or more pair of symbols with same pilot pattern to obtain a set of estimated values of the frequency offset, where symbols in each pair are spaced apart by at least one symbol period, logic for averaging estimated values of the frequency offset from the set of estimated values to obtain a second estimated value of the frequency offset, and logic for computing a third estimated value of the frequency offset by using the first estimated value of frequency offset, the second estimated value of frequency offset and the weighting factor.

Certain embodiments of the present disclosure provide an apparatus for a wireless communication system. The apparatus generally includes means for correlating pilots from a pair of consecutive symbols with same pilot pattern to obtain a first estimated value of a frequency offset, means for determining a weighting factor based on the first estimated value of the frequency offset, means for correlating pilots from one or more pair of symbols with same pilot pattern to obtain a set of estimated values of the frequency offset, where symbols in each pair are spaced apart by at least one symbol period, means for averaging estimated values of the frequency offset from the set of estimated values to obtain a second estimated value of the frequency offset, and means for computing a third estimated value of the frequency offset by using the first estimated value of frequency offset, the second estimated value of frequency offset and the weighting factor.

Certain embodiments of the present disclosure provide a computer-program product for a wireless communication system, comprising a computer readable medium having instructions stored thereon, the instructions being executable by one or more processors. The instructions generally include instructions for correlating pilots from a pair of consecutive symbols with same pilot pattern to obtain a first estimated value of a frequency offset, instructions for determining a weighting factor based on the first estimated value of the frequency offset, instructions for correlating pilots from one or more pair of symbols with same pilot pattern to obtain a set of estimated values of the frequency offset, where symbols in each pair are spaced apart by at least one symbol period, instructions for averaging estimated values of the frequency offset from the set of estimated values to obtain a second estimated value of the frequency offset, and instructions for computing a third estimated value of the frequency offset by using the first estimated value of frequency offset, the second estimated value of frequency offset and the weighting factor.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
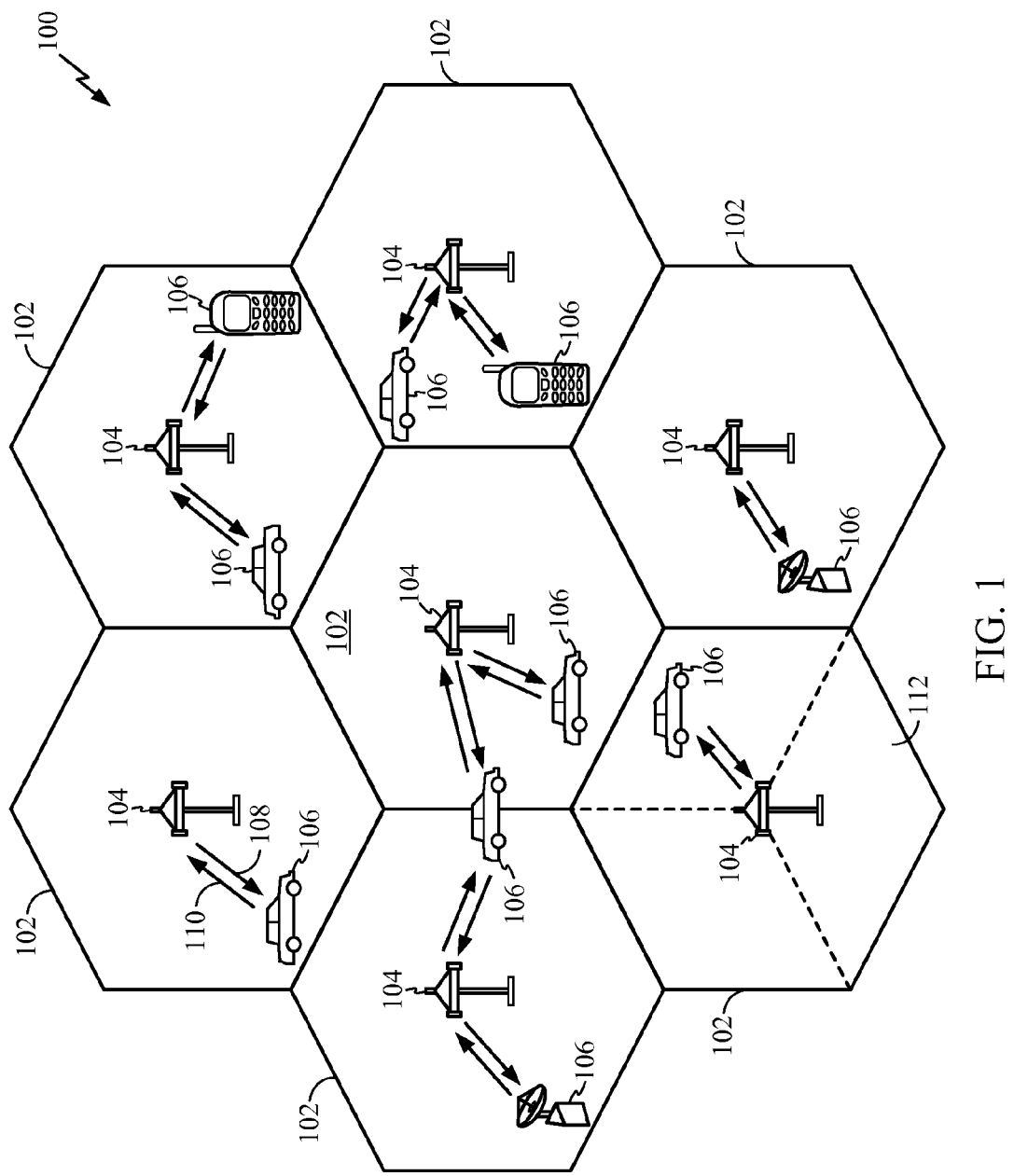
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

The Cyclic Prefix (CP) based method for estimating the carrier frequency offset at a receiver of an Orthogonal Frequency Division Multiplexing (OFDM) system is based on correlating uncorrupted samples in the CP with the corresponding samples occurring N samples later, where N is the length of the applied Fast Fourier Transform (FFT). The main advantage of this method is that the frequency offset can be computed at the symbol rate. Also, the accuracy of the CP-based method may be acceptable only when the length of the Channel Impulse Response (CIR) is less then one half of the CP length. However, the performance of this method can be sensitive to the symbol time offset. Furthermore, the accuracy can be degraded due to an Inter-Symbol Interference (ISI) when the length of CIR is longer than the length of CP. In addition, the CP-based method may not be stable if the frame arrival times of neighboring base stations are not synchronized.

The pilot-based method can track the carrier frequency offset in the frequency domain by measuring a phase shift that occurs in consecutive symbols at known pilot locations. In typical OFDM systems, such as the Worldwide Interoperability for Microwave Access (WiMAX) system, these pilot locations can be predefined for a preamble and can be deduced from sub-channel group information specified in the frame control header (FCH) for the 1st Partially Used Sub-Carrier (PUSC) zone that follows the preamble symbol. The pilot-based tracking method can perform well even for frequency selective channels where the length of CIR is long, and this method is not sensitive to possible frame time offsets in neighboring base stations. However, pilots are required for this method, and the pilot pattern can vary for different permutation zones in OFDM systems. In WiMAX, for example, both the preamble and the 1st PUSC zone can be used for the pilot-based tracking of the frequency offset since pilot locations are known. However, the repetition rate of the pilots can be long, which effectively limits the update rate and hence the bandwidth of the frequency tracking loop. Also, the long duration between consecutive preamble symbols can introduce a smaller tracking range compared to the CP-based tracking method.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one medium access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
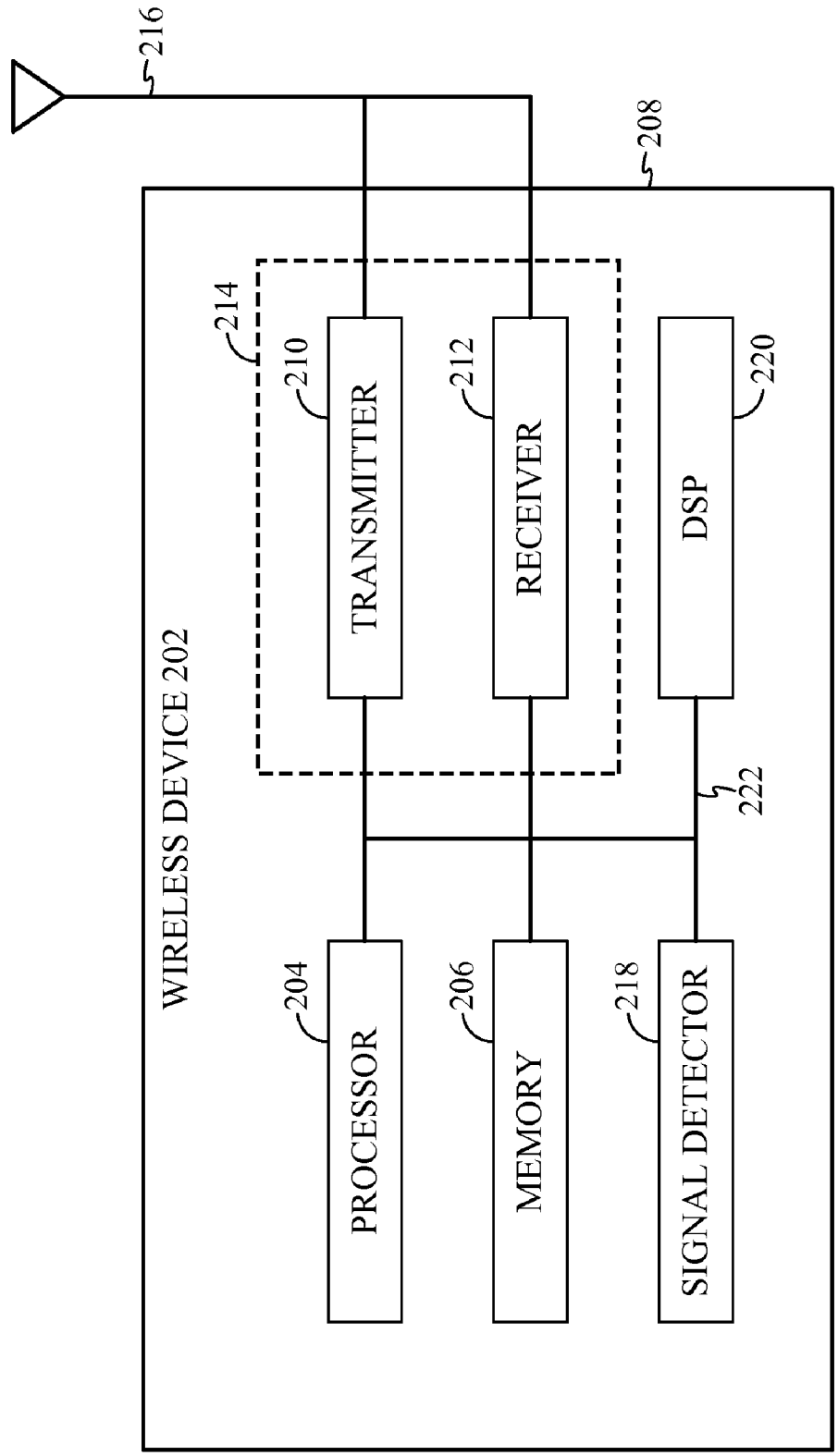
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
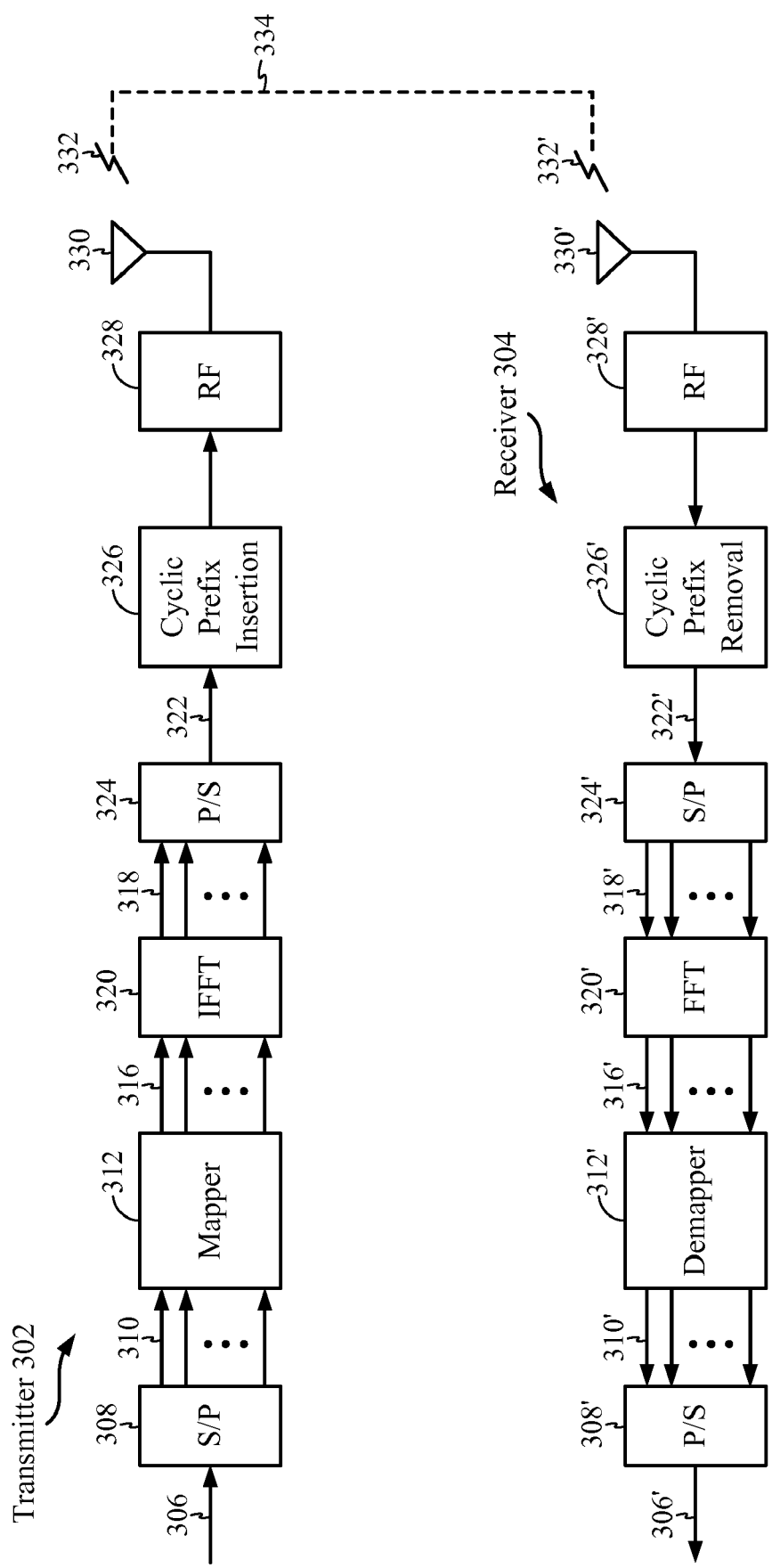
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, NS, is equal to NCP (the number of cyclic prefix (CP) samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A cyclic prefix insertion component 326 may insert a CP between successive OFDM/OFDMA symbols in the OFDM/OFDMA symbol stream 322. The output of the CP insertion component 326 may then be up-converted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be down-converted to a baseband signal by an RF front end 328'. A CP removal component 326' may then remove the CP that was inserted between OFDM/OFDMA symbols by the CP insertion component 326.

The output of the CP removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Exemplary Introduction to Frequency Tracking Algorithm

The present disclosure proposes a soft combined frequency tracking discriminator incorporated within a frequency tracking loop (FTL) of the first and the second order providing accurate tracking of both fast and slow variations of the carrier frequency offset. The proposed structure of the FTL can provide, in an initial pull-in mode, fast tracking of the frequency offset caused by the large residual frequency offset from acquisition stage, as well as tracking, in a fine-tracking mode, of a small residual frequency variance due to Doppler frequency, temperature change and/or aging of a circuitry.

The proposed frequency offset tracking algorithm may be implemented at a mobile station (MS) in an OFDM wireless system. It can be assumed that an initial frequency offset may be corrected during acquisition and coarse frequency offset (CFO) estimation processes. It can be also assumed that a preamble sequence of the strongest sector has been acquired at the MS, and correct fast Fourier transform (FFT) window position and a length of channel impulse response (CIR) have been determined by a time tracking loop (TTL).

Exemplary Signal Model

The transmission signal obtained after an Inverse Fast Fourier Transform (IFFT) $s_i(n)$ in the ith OFDM symbol may be expressed as:

$$s_i(n) = \frac{1}{\sqrt{N}} \sum_{k=-N/2}^{N/2} S_{i,k} e^{j2\pi k \frac{(n-G)}{N}}, \quad (1)$$

where G is the length of the CP, N is the size of the FFT, k is the sub-carrier index, $S_{i,k}$ is a tone that corresponds to the kth sub-carrier in the ith OFDM symbol, $i \cdot (N+G) \leq n \leq (i+1) \cdot (N+G)$, and $s_i(n)$ satisfies that:

$$s_i(n) = \begin{cases} \neq 0, & i \cdot (N+G) \leq n < (i+1) \cdot (N+G) \\ 0 & \text{otherwise} \end{cases} \quad (2)$$

It can be assumed that the length of the CIR is finite with L channel taps, $h = [h_1 \ldots, h_L]^T$. The vector of received signals may be obtained by convolving the transmission signal vector s with the channel impulse response, i.e., $$r = s \otimes h. \quad (3)$$

By considering the frequency offset, the received OFDM signal in a time domain may be represented as:

$$z_n = r_k e^{j2\pi \delta_f n/N} + n_n, \quad (4)$$

where $r_k$ is an amplitude of the received signal without frequency offset, $$\delta_f = \frac{\varepsilon}{\Delta f}$$

is a relative frequency offset (i.e., ratio of the actual frequency offset to the subcarrier spacing), and $n_n$ is the Additive White Gaussian Noise (AWGN). It can be assumed that the main frequency offset has been corrected by an acquisition module and a coarse frequency offset (CFO) module, and the residual relative frequency offset satisfies $|\delta_f| = 0.5$. After removing the CP, the received signal model in the frequency domain can be written as:

$$Z_k = \frac{1}{\sqrt{N}} \sum_{n=0}^{N-1} z_n e^{-j2\pi \frac{nk}{N}}, \quad (5)$$

$$0 \leq k \leq N-1.$$

Exemplary Discriminators for Frequency Offset Tracking

Based on the previously introduced signal model, the CP-based and pilot-based frequency offset tracking algorithms can be described in more details. These two approaches can be utilized for deriving a proposed combined frequency tracking discriminator.

Time domain samples of the CP are copies of the last G samples of an OFDM symbol. Assuming that the length L of a CIR is less than G, it may be possible to select in every received OFDM symbol the (G−L) uncorrupted pairs of samples that are spaced N samples apart. These (G−L) pairs of samples may be identical except for a phase rotation, which depends on the frequency offset as indicated in equation (4).

The frequency offset can be estimated by performing the following correlation:

$$C = \sum_{n=-(G-L)}^{-1} z_n z_{n+N}^H, \quad (6)$$

where $z_n$ is the received signal in time domain defined in equation (4). It can be noted from equation (6) that (G−L) samples are utilized instead of G samples in order to provide more reliable tracking of the frequency offset since the first L samples within the received OFDM symbol may be corrupted by the interference from a previous OFDM symbol. The fine frequency offset estimation may be computed as:

$$\delta_f = \frac{1}{2\pi} \arg(C), \quad (7)$$

where arg(•) indicates an angle of enclosed complex number and it is limited to the range [−π,+π].

Among N utilized subcarriers, it can be assumed that $N_p$ subcarriers may be modulated by pilot symbols. By defining Φ as a set of indexes that correspond to $N_p$ pilot subcarriers, the fine frequency offset estimation may be obtained as:

$$\delta_f = \frac{N}{2\pi D(N+G)} \arg\left\{\sum_{k \in \Phi}(Z_{m,k} \cdot P_{m,k}) \cdot (Z_{m+D,k} \cdot P_{m+D,k})^H\right\}, \quad (8)$$

where m and m+D are indexes of OFDM symbols with the same pilot pattern in the frequency domain, $P_{m,k}$ and $P_{m+D,k}$ are pilots transmitted over the same subcarrier within the mth and the (m+D)th OFDM symbol, and D is an integer that indicates that there are D−1 OFDM symbols placed between the pair of OFDM symbols with the same pilot pattern. Thus, the tracking range can satisfy $\delta_f$<0.4444 for D=1 (i.e., N=1024 and G=128), and $\delta_f$<0.2222 for D=2. This particular scheme may yield a smaller tracking range compared to the CP-based method.

It is possible to derive a bound on an Inter-Carrier Interference (ICI) induced by the frequency offset. By combining equations (3) and (4), equation (5) can be rewritten as:

$$Z_k = (S_k H_k)\frac{\sin(\pi\delta_f)}{N\sin(\pi\delta_f/N)} e^{j\pi\delta_f(N-1)/N} + I_k + W_k, \quad (9)$$

where $W_k$ is the AWGN, and $I_k$ is the ICI caused by the frequency offset for the kth subcarrier position. It can be shown that the ICI term from equation (9) may be empirically bounded as:

$$E|I_k|^2 \leq 0.5947 |S_k|^2 |H_k|^2 (\sin \pi\delta_f)^2, |\delta_f|<0.5 \quad (10)$$

Considering equations (9) and (10), a carrier-to-interference-plus-noise ratio (CINR) loss in dB (decibel) units due to the frequency offset may be computed as:

$$\text{CINR\_loss (dB)} = \text{CINR\_in (dB)} - \text{CINR\_out (dB)}, \quad (11)$$

where CINR_in and CINR_out may be derived as:

$$\text{CINR\_in} = 10\log_{10}(E(|S_k|^2|H_k|^2)/E|W_k|^2), \quad (12)$$

$$\text{CINR\_out} = 10\log_{10}\left(\frac{E(|S_k|^2|H_k|^2)\{(\sin\pi\delta_f/(\pi\delta_f))^2\}}{0.5947 \cdot E(|S_k|^2|H_k|^2)(\sin\pi\delta_f)^2 + E|W_k|^2}\right). \quad (13)$$

After including equation (12) into equation (13), equation (13) may be rewritten as:

$$\text{CINR\_out} = \text{CINR\_in} + 10\log_{10}\left(\frac{(\sin\pi\delta_f/(\pi\delta_f))^2}{1 + 0.5947 \cdot CINR(\sin\pi\delta_f)^2}\right). \quad (14)$$

Substituting equation (12) and equation (14) in equation (11), the following expression may be obtained for the CINR loss caused by the frequency offset:

$$\text{CINR\_loss(dB)} = -10\log_{10}\left(\frac{(\sin\pi\delta_f/(\pi\delta_f))^2}{1 + 05947 \cdot CINR(\sin\pi\delta_f)^2}\right). \quad (15)$$

Figure 4A:
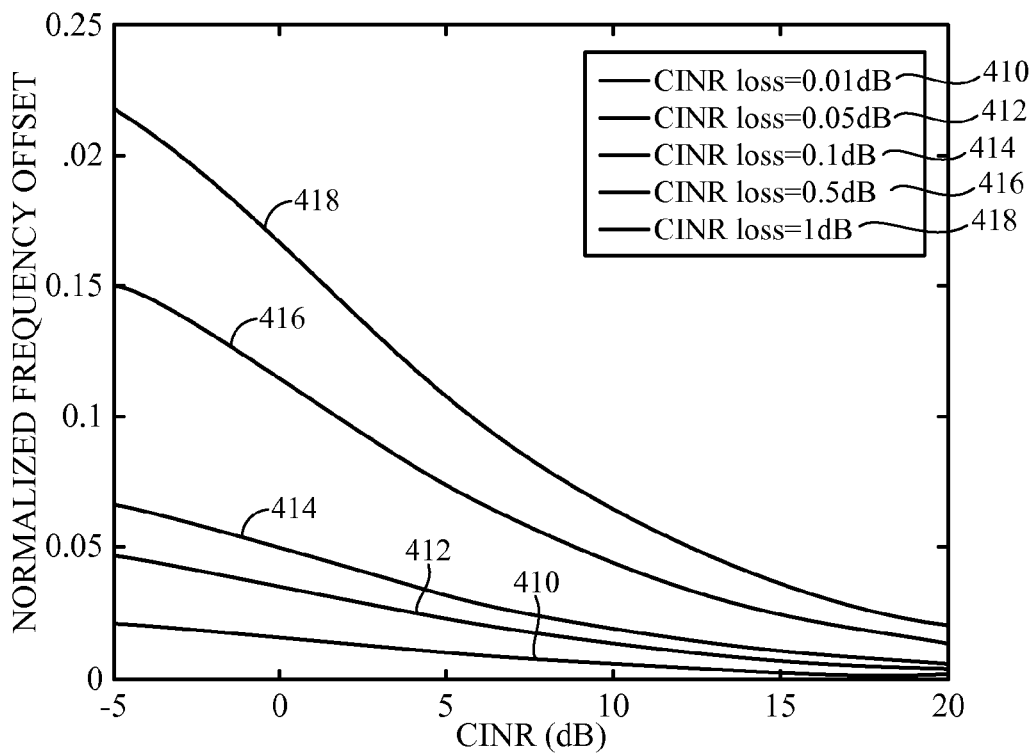
FIGS. 4A-4B illustrate a carrier-to-interference-plus-noise ratio (CINR) loss versus normalized frequency offset and absolute frequency offset at various input CINR levels, respectively in accordance with certain embodiments of the present disclosure.
Figure 4B:
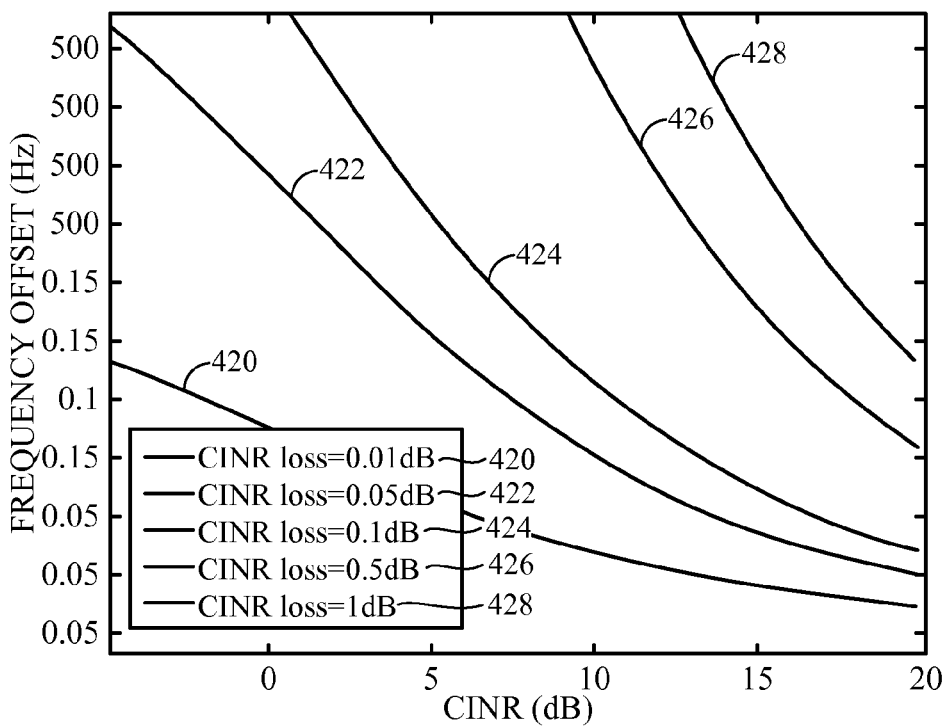

FIG. 4A illustrates the CINR loss as a function of a normalized frequency offset at various input CINR levels, and FIG. 4B illustrates the CINR loss as a function of an absolute frequency offset at various input CINR levels. A sampling rate of 11.2 MHz is used in this exemplary case, and there are 1024 subcarriers in the system. It can be noticed from FIGS. 4A-4B that if the frequency offset is larger, then the resulting CINR loss is also larger for the same input CINR level.

Exemplary Frame Struction and Methods for Preamble Pilot Interpolation

Figure 5:
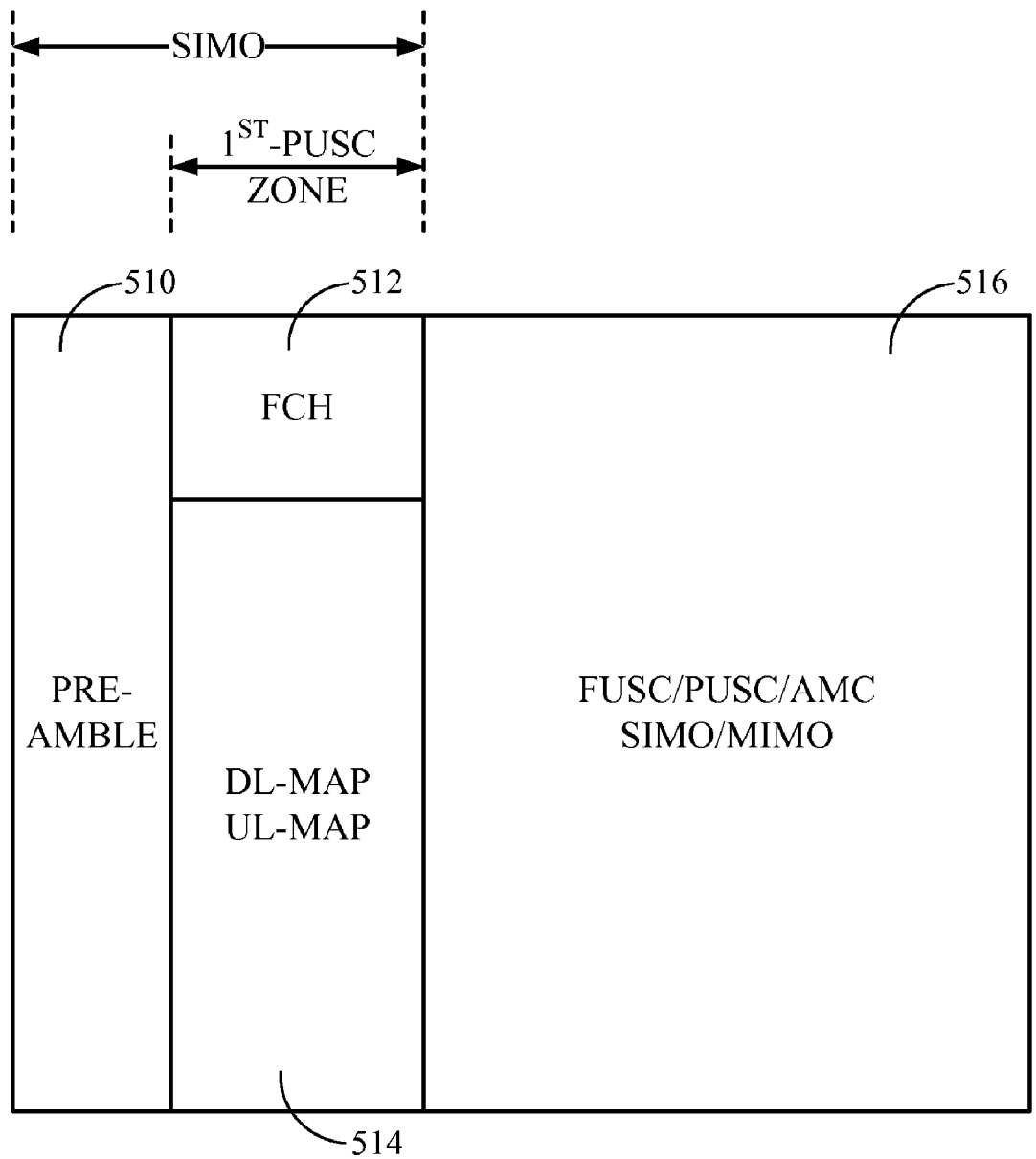
FIG. 5 illustrates a frame structure specified for the IEEE 802.16e standard in accordance with certain embodiments of the present disclosure.

FIG. 5 illustrates a frame structure specified for the IEEE 802.16e standard. According to the IEEE 802.16e standard, the preamble 510 and the 1st PUSC zone can always occur in every frame with a single-input multiple-output (SIMO) mode, as specified in FIG. 5. The 1st PUSC zone consists of a Forward channel (FCH) 512, a downlink (DL) MAP 514, and an uplink (UL) MAP 514. Either a Fully Used Sub-carrier (FUSC) zone or a PUSC zone or an Adaptive Modulation Coding (AMC) zone 516 can follow the 1st PUSC zone for both SIMO and multiple-input multiple-output (MIMO) modes. Every frame can comprise a plurality of OFDM symbols.

For certain embodiments of the present disclosure, pilots of the preamble symbol may occur in every third subcarrier, and pilots of the OFDM symbols of the 1st PUSC zone may be located in different positions relative to pilot positions from the preamble symbol. In order to perform pilot-based correlation between the preamble symbol and symbols of the 1st PUSC zone, an interpolation operation may be performed on preamble pilots so that they are lined up with pilots in symbols of the 1st PUSC zone. Following that, equation (8) can be readily applied for estimating the frequency offset.

Two different methods may be employed for pilot interpolation: a least-square (LS) based interpolation (i.e., a one-dimensional quadratic method) and a nearest-copy based interpolation. Based on a coherence bandwidth of the channel, a quadratic parametric model describing the channel response at each frequency subcarrier may be written as:

$$h(f) = \frac{(f-f_0)^2}{f_{sc}^2}\Delta f^2 + \frac{f-f_0}{f_{sc}}\Delta f + c + n, \quad (16)$$

where $f_{sc}$ is a subcarrier spacing, $$\Delta f^2 = \frac{\partial^2 h}{\partial f^2}$$

is a second order derivative in frequency, $$\Delta f = \frac{\partial h}{\partial f}$$

is a slope in frequency, $c=h(t_0, f_0)$ is a constant (DC) term, $(t_0, f_0)$ is a center of the plane to be fitted, and n is the AWGN with zero mean and variance $\sigma^2$.

Equation (16) may be rewritten for each observation in a matrix form by stacking up observations results, as in:

$$h = A\theta + n, \quad (17)$$

where h is a column vector representing noisy pilot observables, A is an observation matrix, and θ is a column vector consisting of channel parameters $\Delta f^2$, $\Delta f$, c to be estimated:

$$\theta = \begin{bmatrix} \Delta f^2 \\ \Delta f \\ c \end{bmatrix}. \quad (18)$$

The least-square (LS) solution $\hat{\theta}$ of channel parameters defined by equation (18) may be obtained as:

$$\hat{\theta} = (A^T A)^{-1} A^T h, \quad (19)$$

and the corresponding interpolated channel estimates at carrier locations of the preamble may be calculated as:

$$h_{int} = T_{int} \hat{\theta}, \quad (20)$$

where $T_{int}$ is a matrix related to interpolation positions and $h_{int}$ is an interpolated channel response vector.

Another method to perform the interpolation on preamble pilots in order to line them up with pilots in symbols of the 1st PUSC zone can be the nearest-copy based interpolation. For this method, channel responses from the nearest pilot positions can be copied to the appropriate subcarrier positions that correspond to pilot locations in symbols of the 1st PUSC zone.

Exemplary Combined Frequency Tracking Algorithm

Figure 6A:
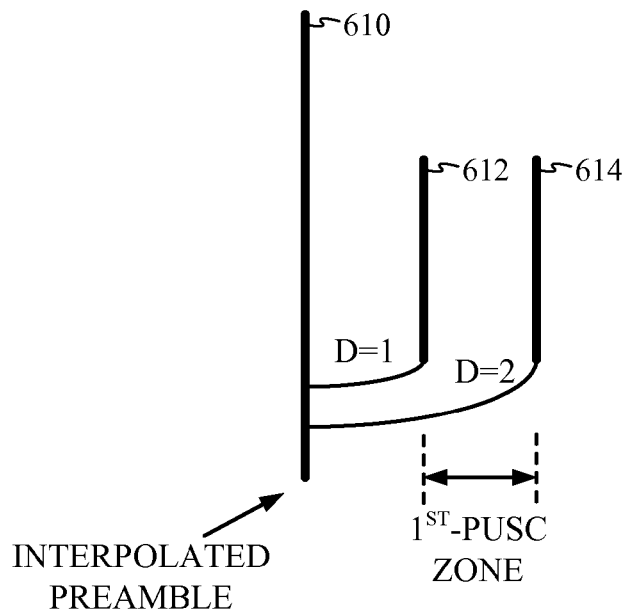
FIGS. 6A-6B illustrate correlation between pilots of a preamble and pilots of OFDM symbols in the 1st PUSC zone in accordance with certain embodiments of the present disclosure.
Figure 6B:
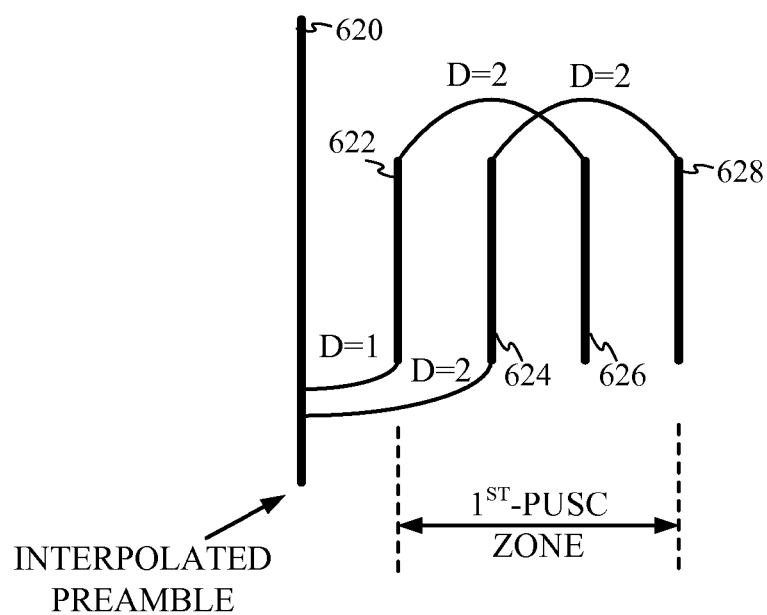

FIGS. 6A-6B illustrate correlation between pilots of a preamble and pilots of OFDM symbols in the 1st PUSC zone for the purpose of estimating a frequency offset. The frequency offset of up to one half of the sub-carrier spacing (i.e., $$\pm \frac{N}{2(N+G)} f_{sc})$$

may be estimated by applying the pilot-based correlation between interpolated pilots of the preamble symbol 610 and pilots of the following symbol 612 that belongs to the 1st PUSC zone, while symbol spacing parameter D from equation (8) is equal to one, as illustrated in FIG. 6A.

If D=2, then the frequency offset may be estimated using the pilot-based correlation within the range $$\pm \frac{N}{4(N+G)} \Delta f.$$

As illustrated in FIG. 6A, the correlation between interpolated pilots of the preamble symbol 610 and pilots of the symbol 614 of the 1st PUSC zone may be performed. Naturally, the tracking performance may be improved if pilots from more symbols of the 1st PUSC zone are utilized.

Due to an ambiguity problem for the pilot-based correlation with the parameter D=2 (i.e., $\delta_f < 0.2222$), a frequency tracking discriminator incorporated in a frequency tracking loop (FTL) may only use the pilot-based correlation with the parameter D=1 when the residual frequency offset $\delta_{f,D=1}$ is large (e.g., $\delta_{f,D=1} > 0.15$). However, when $\delta_{f,D=1}$ is small, both $\delta_{f,D=1}$ and $\delta_{f,D=2}$ may be combined to improve the discriminator performance. Hence, a soft combining of the $\delta_{f,D=1}$ and $\delta_{f,D=2}$ can be proposed as follows:

$$\delta_{f,joint} = \alpha \delta_{f,D=1} + (1-\alpha) \delta_{f,D=2}, \quad (21)$$

where a weighting factor $\alpha$ may be determined as a function of the $\delta_{f,D=1}$ value. The frequency offset value $\delta_{f,D=1}$ may be obtained by the pilot-based correlation between interpolated preamble pilots of the preamble 620 and pilots of the symbol 622 of the 1st PUSC zone, as illustrated in FIG. 6B.

For certain embodiments of the present disclosure that utilize the nearest-copy based interpolation, the frequency offset value $\delta_{f,D=2}$ may be obtained as the average of two correlation measurements in the 1st PUSC zone with the parameter D=2. As illustrated in FIG. 6B, one correlation measurement may be performed between pilots of symbols 622 and 626 in order to obtain $\delta_{f,D=2,pusc}^1$, and the other correlation measurement may be performed between pilots of symbols 624 and 626 in order to obtain $\delta_{f,D=2,pusc}^2$, while all symbols utilized in these two correlation measurements are symbols of the 1st PUSC zone. The average of these two correlation measurements may be given as:

$$\delta_{f,D=2} = \frac{(\delta_{f,D=2,puse}^1 + \delta_{f,D=2,puse}^2)}{2}. \quad (22)$$

Figure 7A:
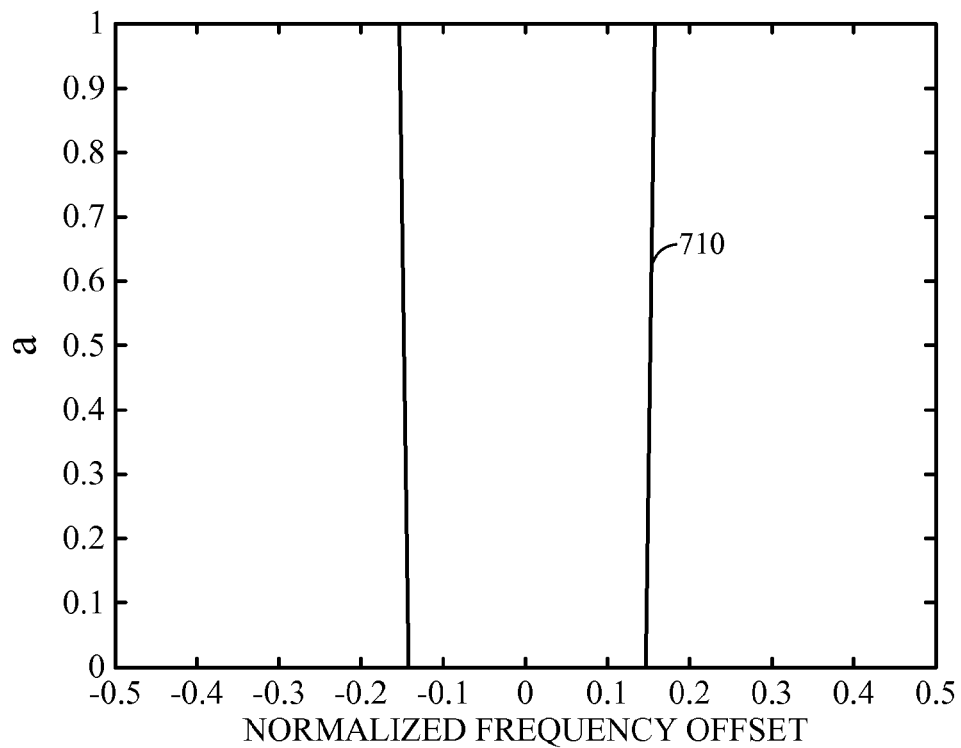
FIGS. 7A-7B illustrate a weighting factor applied for a combined frequency offset tracking discriminator as a function of the normalized frequency offset in accordance with certain embodiments of the present disclosure.

For certain embodiments of the present disclosure, the weighting factor $\alpha$ from equation (21) may be defined as a function of the $\delta_{f,D=1}$ measurement, as illustrated by the plot 710 in FIG. 7A.

For certain embodiments of the present disclosure, the LS-based interpolation of preamble pilots may be utilized. In this case, $\delta_{f,D=2}$ may be obtained as the average value among three correlation measurements in the 1st PUSC zone with parameter D=2:

$$\delta_{f,D=2} = \frac{(\delta_{f,D=2,pa} + \delta_{f,D=2,puse}^1 + \delta_{f,D=2,puse}^2)}{3}, \quad (23)$$

where $\delta_{f,D=2,pusc}^1$ and $\delta_{f,D=2,pusc}^2$ are defined as before, and $\delta_{f,D=2,pa}$ corresponds to the frequency offset value obtained by correlating the interpolated preamble pilots of the preamble 620 and pilots of the symbol 624 of the 1st PUSC zone, as illustrated in FIG. 6B. It can be also noted that prior to the LS-based pilot interpolation, a center of mass (CM) based linear phase compensation may be applied on the preamble symbol 620 and on symbols 622 and 624 of the 1st PUSC Zone.

Figure 7B:
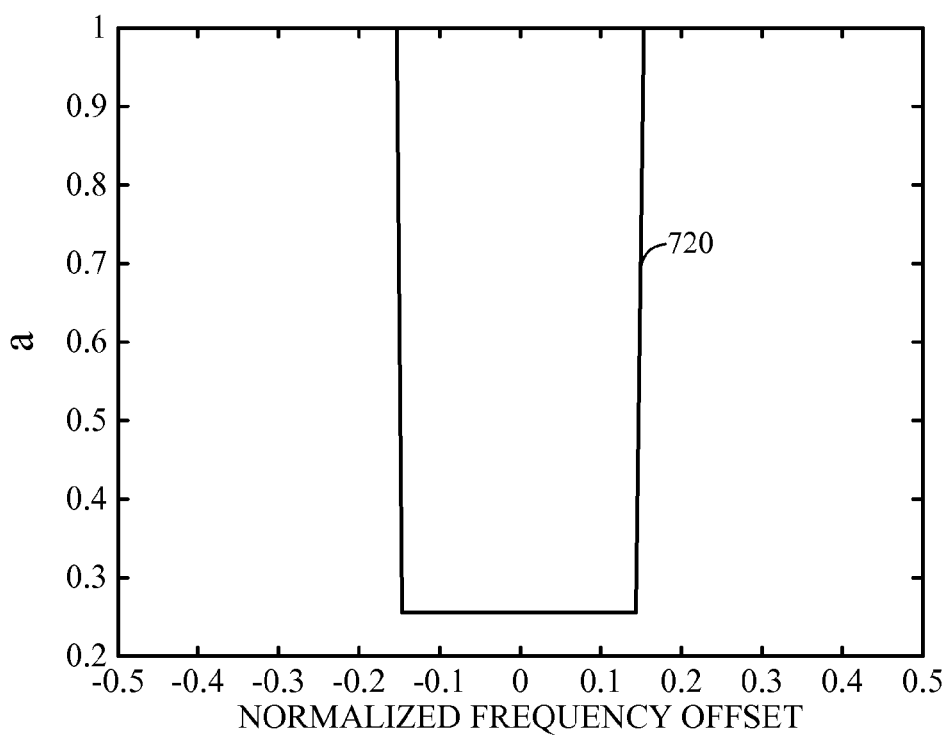

The soft combining of the $\delta_{f,D=1}$ and $\delta_{f,D=2}$ may be now performed as:

$$\delta_{f,joint} = \alpha \delta_{f,D=1} + (1-\alpha) \delta_{f,D=2}, \quad (24)$$

where the weighting factor $\alpha$ may be chosen as a function of the $\delta_{f,D=1}$ value illustrated by the plot 720 in FIG. 7B. The frequency offset value $\delta_{f,D=1}$ may be obtained by correlating interpolated pilots of the preamble 620 and pilots of the symbol 622 of the 1st PUSC zone, as illustrated in FIG. 6B.

It should be also noted that if $0.444 < \delta_f < 0.5$, then the CP-based frequency offset estimate $\delta_{f,CP}$ may be utilized for the pull-in mode of the frequency tracking algorithm, and the soft combined frequency offset tracking discriminator given by equations (21) and (24) may be modified as:

$$\delta_{f,joint} = \alpha(\delta_{f,CP}) \cdot \delta_{f,CP} + (1 - \alpha(\delta_{f,CP})) \cdot (\gamma \cdot \delta_{f,D=1} + (1-\gamma) \cdot \delta_{f,D=2}), \quad (25)$$

where $\alpha(\delta_{f,CP})$ is the weighting factor that depends on the CP-based frequency offset estimate, and a parameter $\gamma$ is applied to control the contributions from $\delta_{f,D=1}$ and $\delta_{f,D=2}$.

Figure 8:
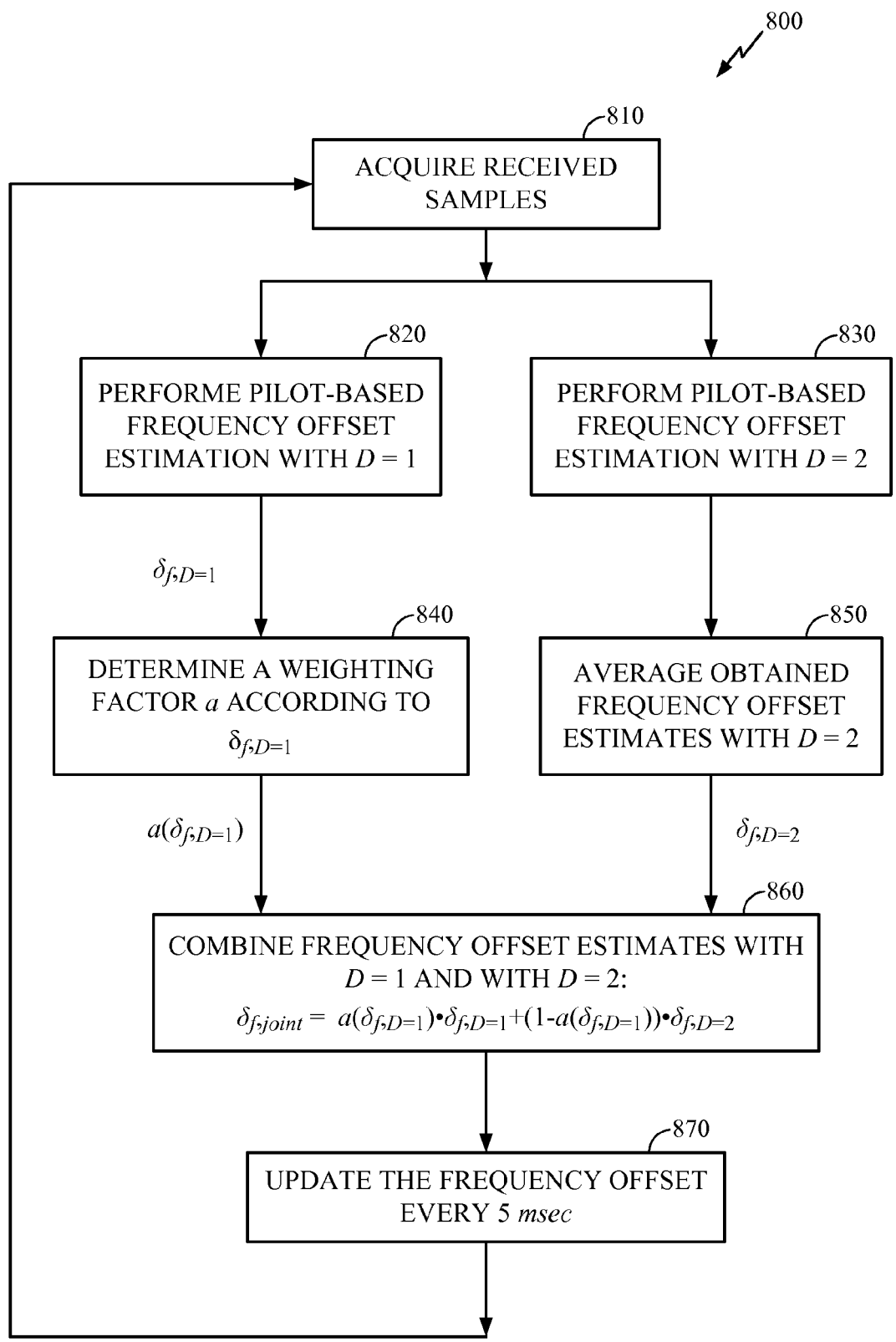
FIG. 8 illustrates example operations for an adaptive tracking of frequency offset in accordance with certain embodiments of the present disclosure.

FIG. 8 illustrates example operations 800 of the proposed combined discriminator for adaptive tracking of the frequency offset. At 810, received samples at a mobile station of the OFDM system may be acquired at a sample server. At 820, the pilot-based frequency offset estimation may be performed with the parameter D=1 to obtain the frequency offset estimate $\delta_{f,D=1}$. At 840, the weighting factor α may be determined based on the frequency offset estimate value $\delta_{f,D=1}$, as illustrated in FIG. 7A or FIG. 7B depending if the copy-based or the LS-based pilot interpolation technique is utilized, respectively.

At 830, the pilot-based frequency offset estimation may be also performed with the parameter D=2. At 850, an averaging of calculated frequency offset estimates with D=2 may be applied as given by equation (22) or equation (23) depending on the employed interpolation technique for pilot locations in the preamble symbol. A frequency-offset value $\delta_{f,D=2}$ may be computed based on the averaging operation performed at 850, as given by equation (22) or (23) if the copy-based or the LS-based pilot interpolation technique is utilized, respectively.

At 860, frequency offset estimates $\delta_{f,D=1}$ and $\delta_{f,D=2}$ may be combined by applying the weighting factor determined at 840, as given by equations (21) and (24). The frequency offset may be updated, at 870, according to the value $\delta_{f,joint}$ computed at 860. The updating period may be 5 msec, as specified by the WiMAX standards.

Figure 9:
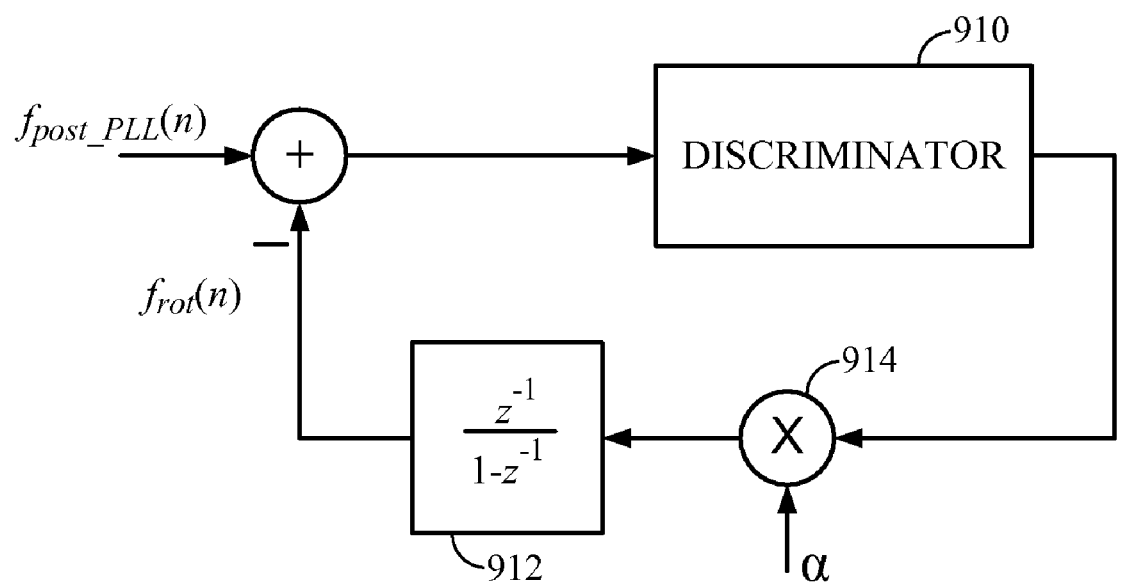
FIG. 9 illustrates a structure of a Frequency Tracking Loop (FTL) of the first order in accordance with certain embodiments of the present disclosure.
Figure 10:
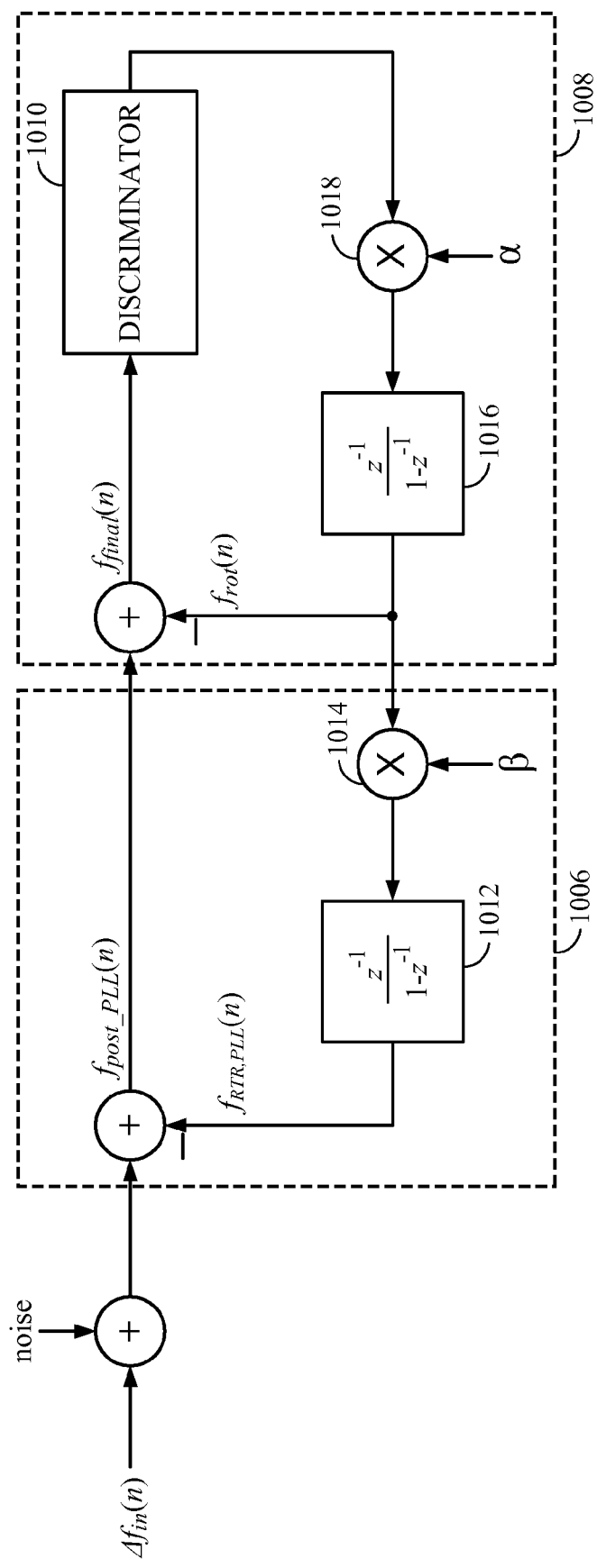
FIG. 10 illustrate a structure of the FTL of the second order in accordance with certain embodiments of the present disclosure.

The proposed combined frequency-tracking discriminator may be incorporated within a closed loop structure forming a stable system. FIG. 9 illustrates a structure of the frequency tracking loop (FTL) of the first order with the proposed soft combined discriminator 910, and FIG. 10 illustrates a structure of the FTL of the second order with the proposed soft combined discriminator 1010.

An output of the FTL (i.e., an output of the discriminator 910) may be applied to a first order loop that can run at a higher bandwidth and remove Doppler dynamics. The first order loop may comprise the multiplier 914 for applying a gain α and the digital filter 912, while $f_{post\_PLL}(n)$ is a post phase-locked loop (PLL) residual frequency offset at the nth received frame, and $f_{rot}(n)$ is a frequency offset estimate obtained by first order loop feedback.

The FTL of the second order may comprise two cascade frequency offset compensation loops: the RTR (Radio Transmitter Receiver) PLL frequency adjustment loop 1006 with the digital filter 1012 and a gain β applied by the multiplier 1014, as well as the first order loop (i.e., digital rotator based frequency compensation) 1008 with the digital filter 1016 and the gain α applied by the multiplier 1018. In order to obtain a residual frequency offset $f_{final}(n)$ as an input into the discriminator 1010, the post-PLL residual frequency offset for the nth frame $f_{post\_PLL}(n)$ may be utilized, as well as the residual frequency offset estimation $f_{rot}(n)$ at the output of the first order loop feedback 1006 may be applied to a digital rotator and the long term residual frequency offset estimation $f_{RTR,PLL}(n)$ obtained at the output of two cascading frequency offset compensation loops 1006 and 1008.

Exemplary Frequency Tracking Loop Design

The design criterion for the loop gain α of the FTL of the first order illustrated in FIG. 9 may be based on two factors: a variance of the residual frequency offset that is related to a CINR loss due to the frequency offset, and a speed of the frequency offset tracking (e.g. a pure tracking of Doppler frequency).

The variance of estimated frequency error over a CINR range in the open-loop-discriminator can be determined through simulations. Then, in the case of the closed loop, the variance of the discriminator output may be reduced by the loop gain α. The CINR loss due to the frequency offset may be given by equation (15). By setting a reasonable CINR loss (for example, CINR loss of 0.05 dB), according to FIGS. 4A-4B, the acceptable residual frequency offset can be obtained over the wide CINR range (i.e., the frequency offset of 500 Hz at −5 dB, 400 Hz at 0 dB, 250 Hz at 5 dB, 150 Hz at 10 dB, 100 Hz at 15 dB, and 50 Hz at 20 dB.) Based on this requirement and the statistics of the open loop discriminator output, an upper bound $\alpha_{up}$ for the loop gain α may be determined.

Figure 11:
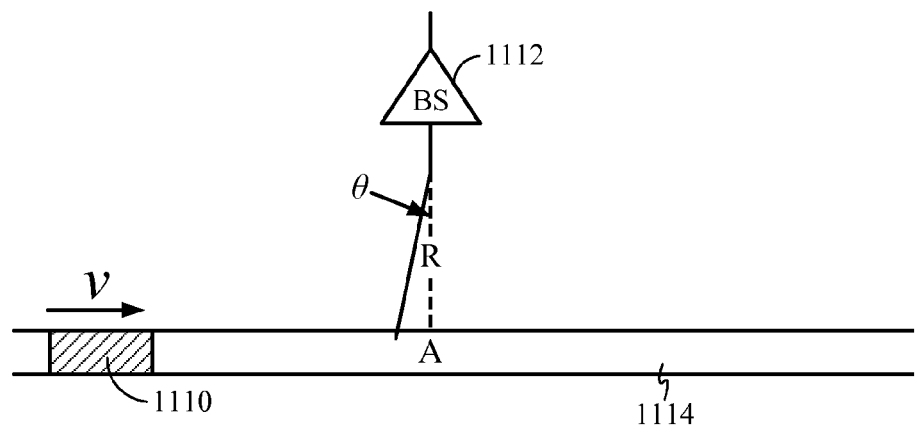
FIG. 11 illustrates an example of a dynamic change of Doppler frequency in accordance with certain embodiments of the present disclosure.

On the other hand, in order to speed up the convergence rate, the loop gain α may need to be as large as possible. In order to determine a lower bound requirement $\alpha_{low}$ of the loop gain α, an exemplary case may be considered where a train 1110 with the speed of 350 km/h is passing a base station (BS) tower 1112 that is 10 m off the tracks 1114, as illustrated in FIG. 11. From the dynamics of this scenario, a pure Doppler dynamic range and a maximum Doppler rate of change may be determined, while $\alpha_{low}$ may be set in order to track system dynamics.

For this exemplary case, the train speed is v=97.2 m/s, the carrier frequency is $f_c$=2.5 GHz, the distance from the BS 1112 to the point A at the track 1114 is R=10 m. Therefore, the maximum Doppler may be computed as:

$$f_{d,max} = \frac{f_c \cdot v}{c} = \frac{2.5 * 10^9 * 97.2}{3 * 10^8} = 810 \text{ Hz}. \quad (26)$$

The maximum Doppler change rate may happen at point A at the track 1114, where the Doppler is given by:

$$f_{d,A} = \frac{f_c \cdot v \cdot \theta}{c}. \quad (27)$$

Also, the following relationship may hold:

$$v \cdot \Delta t = R \cdot \theta. \quad (28)$$

Therefore, by combining equations (27)-(28) the Doppler change rate at the point A at the track 1114 may be determined as:

$$\frac{\partial f_{d,A}}{\partial t} = \frac{f_c \cdot v\theta/c}{R\theta/v} = \frac{v^2 \cdot f_c}{R \cdot c} = 7.87 \text{ KHz/s}. \quad (29)$$

Figure 12:
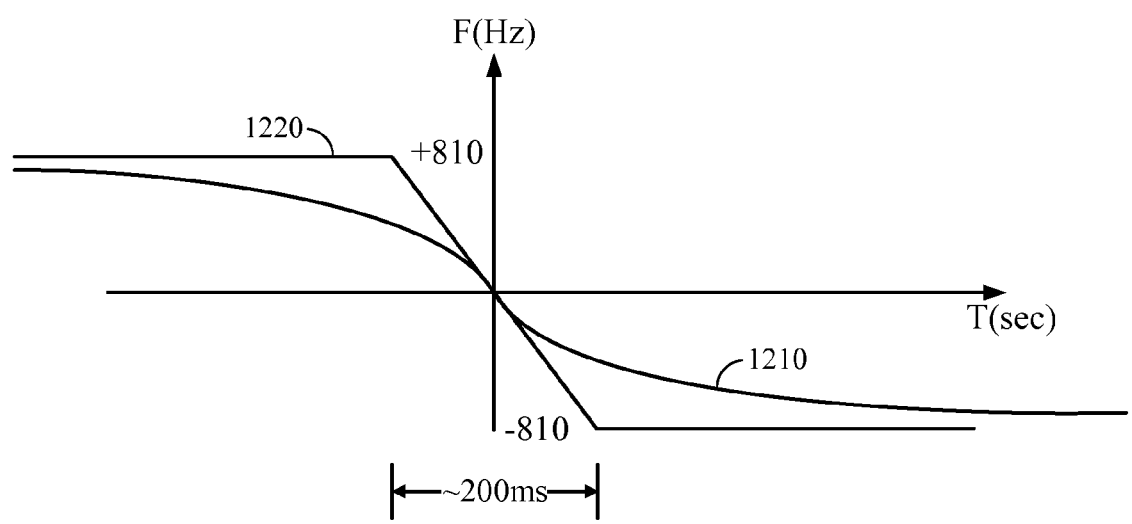
FIG. 12 illustrates an example of a loop convergence time in accordance with certain embodiments of the present disclosure.

An extreme convergence requirement for the frequency tracking loop is illustrated in FIG. 12 with the plot 1210. Assuming that a time constant for the frequency tracking loop of the first order is τ, a good thumb rule may be to set the following condition:

$$5\tau = 200 \text{ ms}, \quad (30)$$

as illustrated in FIG. 12 with the plot 1220. Therefore the time constant τ may be equal to eight update periods at 5 ms update rate. Thus, the lower bound of the loop gain α may be determined as:

$$\alpha_{low} = 1/\tau = 1/8. \quad (31)$$

The design criterion for the loop gains α and β applied in the FTL of the second order illustrated in FIG. 10 may be based on a maximum frequency drift caused by a temperature change and on a step response of the FTL of the second order. According to FIG. 10, two closed loop transfer functions (i.e., for the digital rotator and the RTR PLL), $H_{rot}(z)$ and $H_{RTR,PLL}(z)$, may be defined such that they represent two frequency error corrections:

$$H_{rot}(z) = \frac{f_{rot}(z)}{f_{in}(z)} = \frac{\alpha(z-1)}{z^2 + (\alpha - 2)z + (1 - \alpha + \alpha\beta)}, \quad (32)$$

$$H_{RTR,PLL}(z) = \frac{f_{RTR,PLL}(z)}{f_{in}(z)} = \frac{\alpha\beta}{z^2 - (\alpha - 2)z + (1 - \alpha + \alpha\beta)}. \quad (33)$$

The poles of the FTL of the second order may be calculated as:

$$p_1, p_2 = \frac{2-\alpha}{2} \pm \frac{\sqrt{\alpha^2 - 4\alpha\beta}}{2}. \quad (34)$$

In order to ensure that the loop gains $\alpha$ and $\beta$ satisfy that the poles given by equation (34) are real and bounded by 0 and 1, which is a system stability requirement, the following conditions may need be satisfied:

$$\alpha > 0, \beta > 0, \alpha < 2, \beta > 1 - \frac{1}{\alpha}, \beta < \frac{\alpha}{4}. \quad (35)$$

The step response for transfer functions given by equations (32)-(33) and a combined step response may be computed as follows:

$$h_{rot}(n) = \frac{\alpha}{p_1 - p_2}(-(1-p_1^{n-1}) + (1-p_2^{n-1})), n \geq 1, \quad (36)$$

$$h_{RTR,PLL}(n) = \frac{(1-p_2)(1-p_1^{n-1}) - (1-p_1)(1-p_2^{n-1})}{p_1 - p_2}, n \geq 1, \quad (37)$$

$$h_{combined}(n) = \frac{(1-p_2-\alpha)(1-p_1^{n-1}) - (1-p_1-\alpha)(1-p_2^{n-1})}{p_1 - p_2}, n \geq 1. \quad (38)$$

Based on equations (36)-(38), plots of step responses of the digital rotator, the RTR PLL and the combined response are illustrated in FIGS. 13A-13F for loop gains $\alpha=\frac{1}{8}$ and $\beta=\frac{1}{64}$, $\frac{1}{128}$, $\frac{1}{256}$, $\frac{1}{512}$, $\frac{1}{1024}$, $\frac{1}{4096}$, respectively.

Figure 13A:
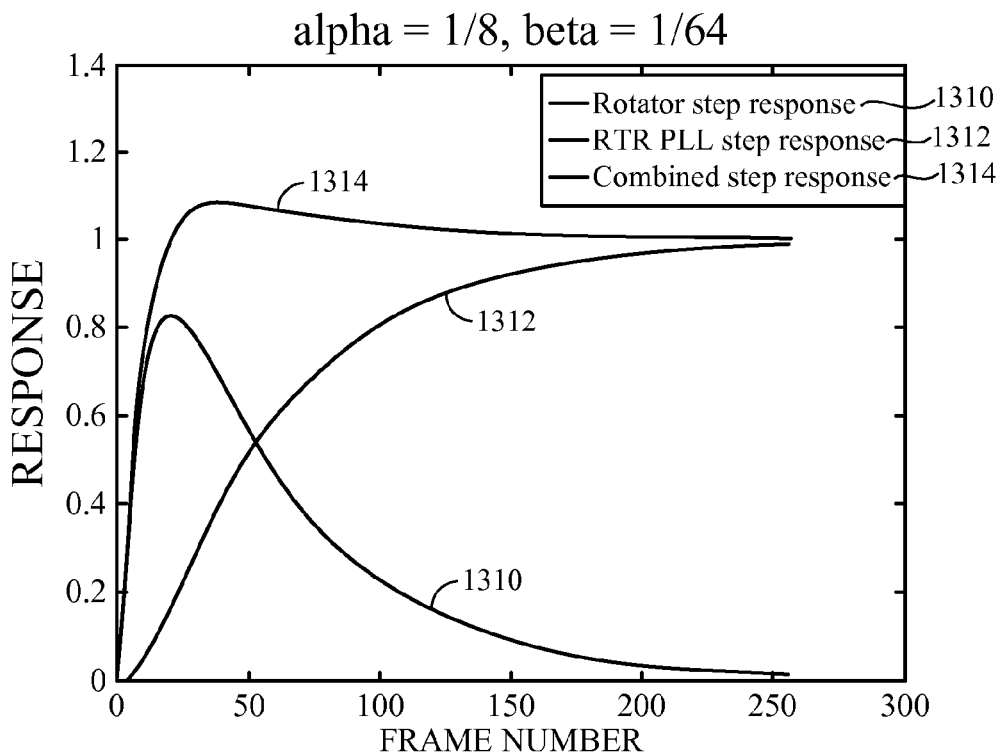
FIGS. 13A-13F illustrate different step responses for various loop gains in accordance with certain embodiments of the present disclosure.
Figure 13B:
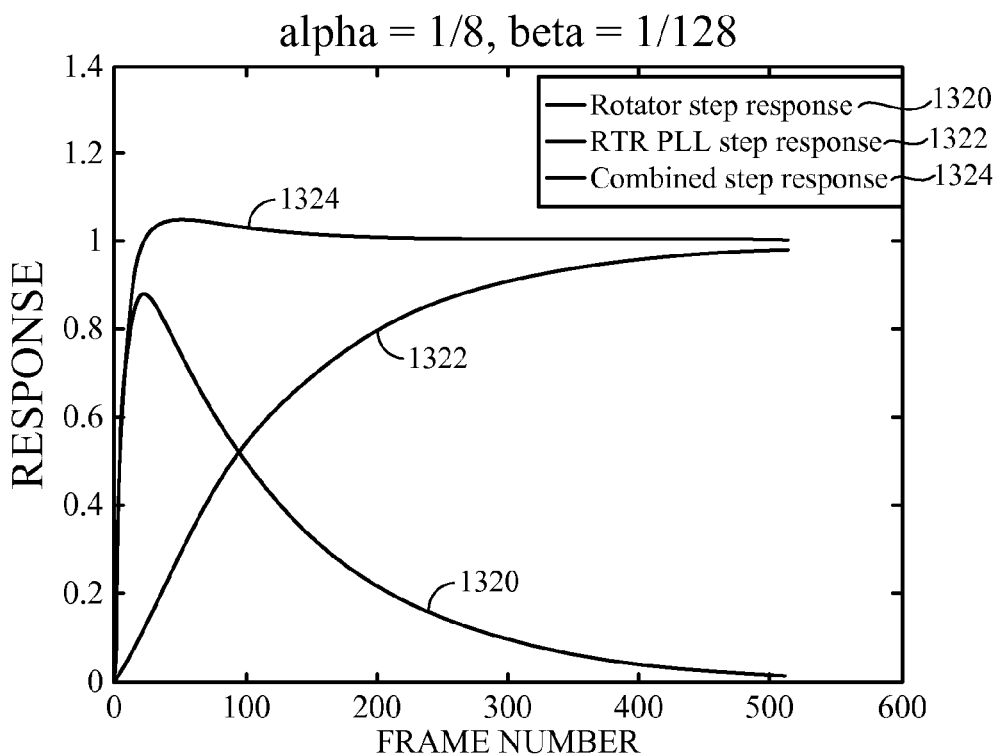
Figure 13C:
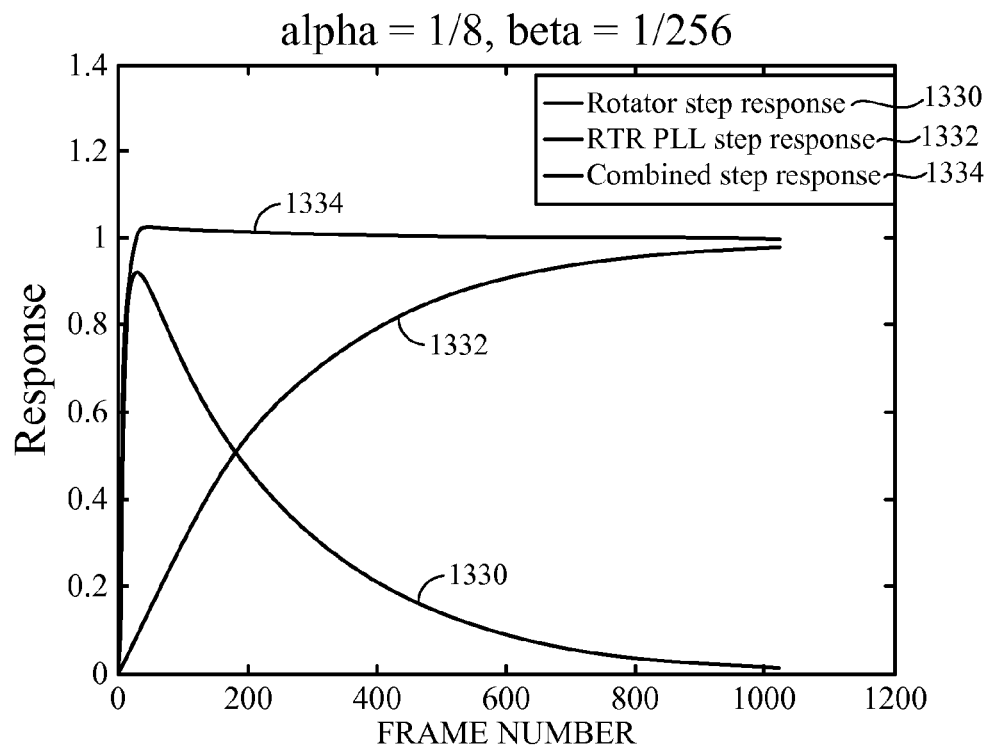
Figure 13D:
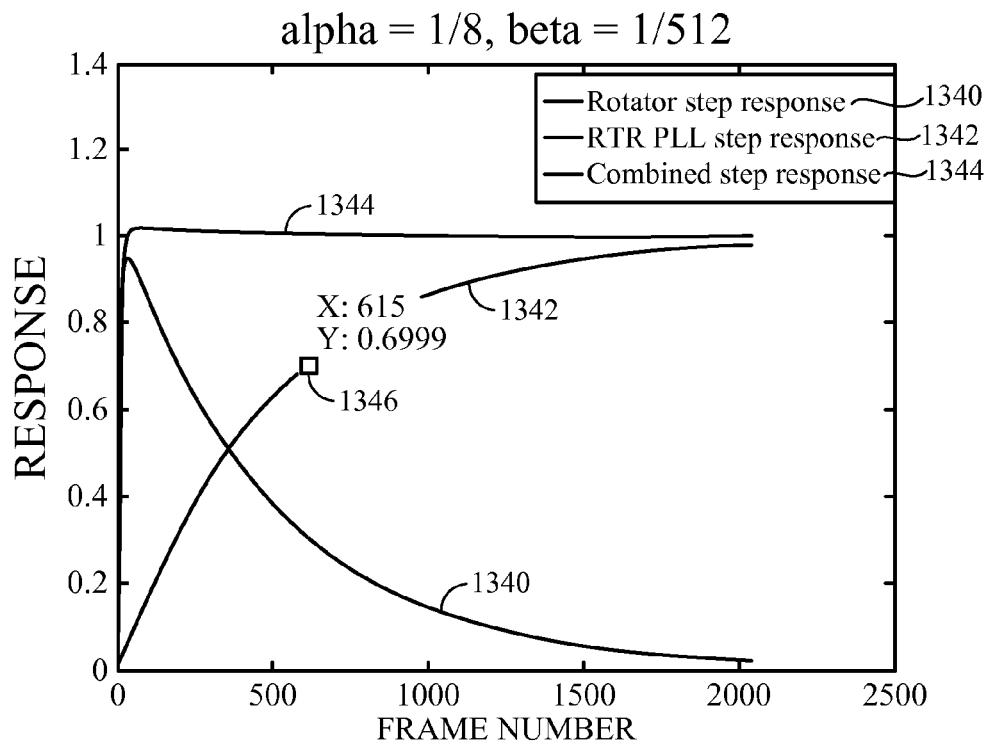
Figure 13E:
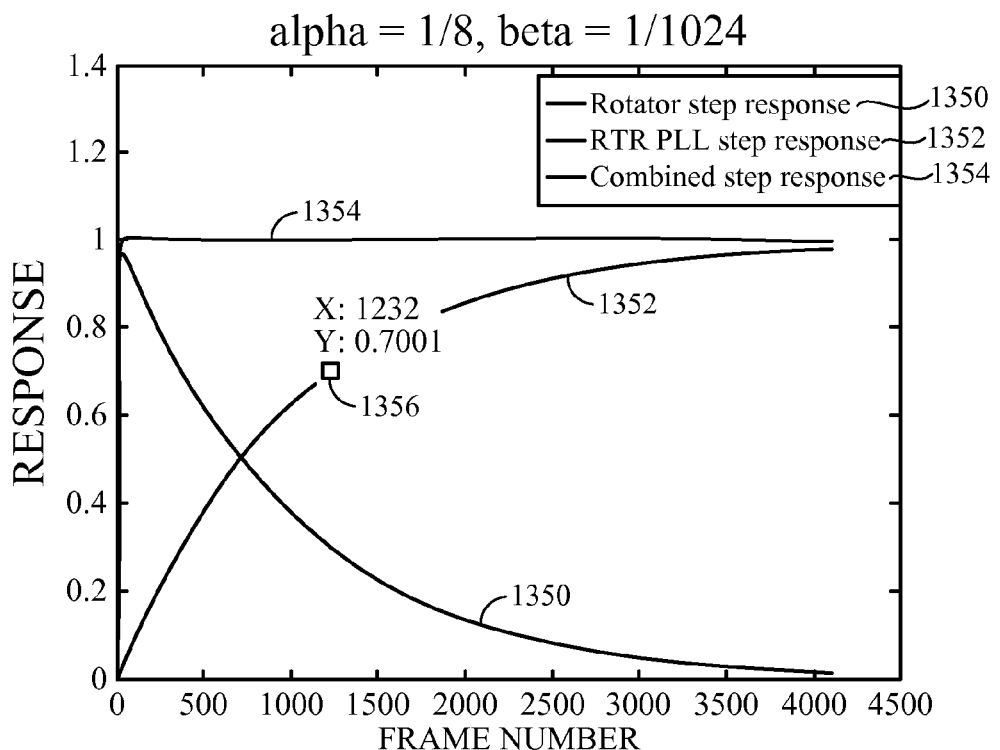
Figure 13F:
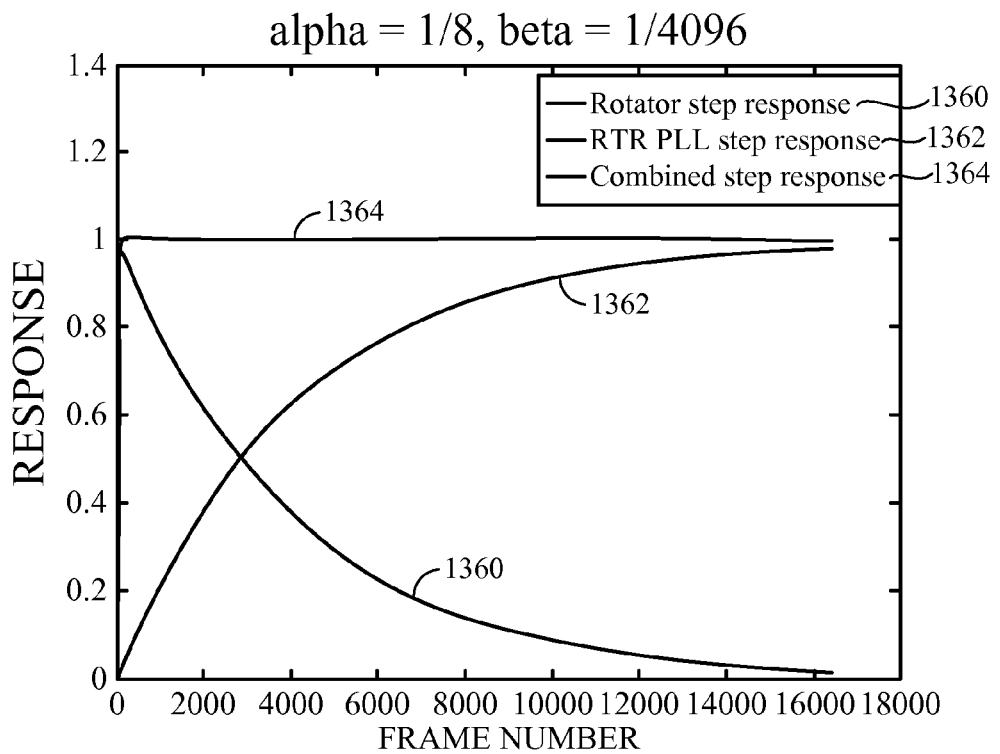
Figure 14A:
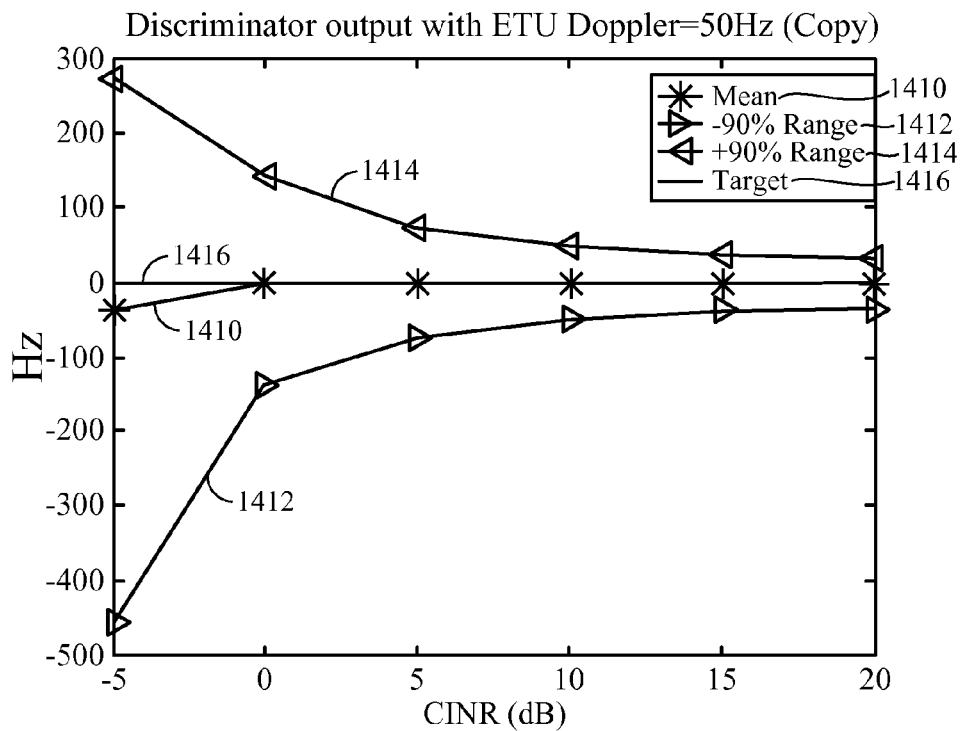
FIGS. 14A-14B illustrate output statistics of a frequency tracking discriminator with a copy-based pilot interpolation in ETU channel for Doppler frequencies of 50 Hz and 300 Hz, respectively in accordance with certain embodiments of the present disclosure.
Figure 14B:
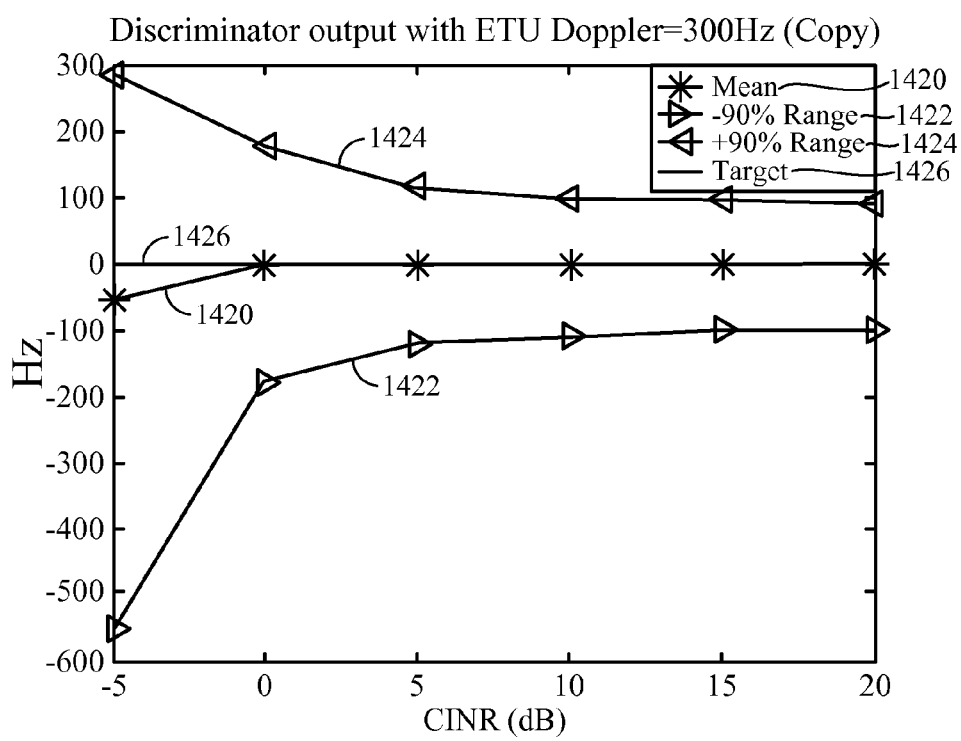

It can be demonstrated that the maximum observed frequency drift is mostly below 2.05 ppb/sec (unit of parts per billion per second). That is, at the carrier frequency of 2.5 GHz, the Doppler change rate may be up to (2.05 ppb/sec)× (2.5 GHz)=5.1 Hz/sec. As illustrated in FIG. 13B, where $\alpha=\frac{1}{8}$ and $\beta=\frac{1}{128}$, approximately 80% of rise time for the RTR PLL represented with plot 1322 may be equal to 1 sec. As illustrated in FIG. 13D, where $\alpha=\frac{1}{8}$ and $\beta=\frac{1}{512}$, 70% of rise time for the RTR PLL labeled with the point 1346 on the plot 1342 is approximately 3.075 sec, which corresponds to the frame number 615 and duration of one frame is 5 msec.

Exemplary Simulation Results

In order to achieve the target variance of the residual frequency offset, statistics of the output of the proposed combined discriminator in an open loop can be studied for different channel models (i.e., AWGN, Pedestrian A, Pedestrian B, Vehicular A, and ETU channels) over the CINR rage of [−5: 5:20] dB. FIGS. 14A-17B illustrate output statistics of the proposed combined frequency offset discriminator with the copy-based interpolation of the preamble pilots for Doppler frequencies of 50 Hz and 300 Hz in ETU channel, Pedestrian A channel, Pedestrian B channel and Vehicular A channel, respectively. FIGS. 18A-21B illustrate output statistics of the proposed combined frequency offset discriminator with the least squares (LS) based interpolation of the preamble pilots for Doppler frequencies of 50 Hz and 300 Hz in ETU channel, Pedestrian A channel, Pedestrian B channel and Vehicular A channel, respectively.

Figure 15A:
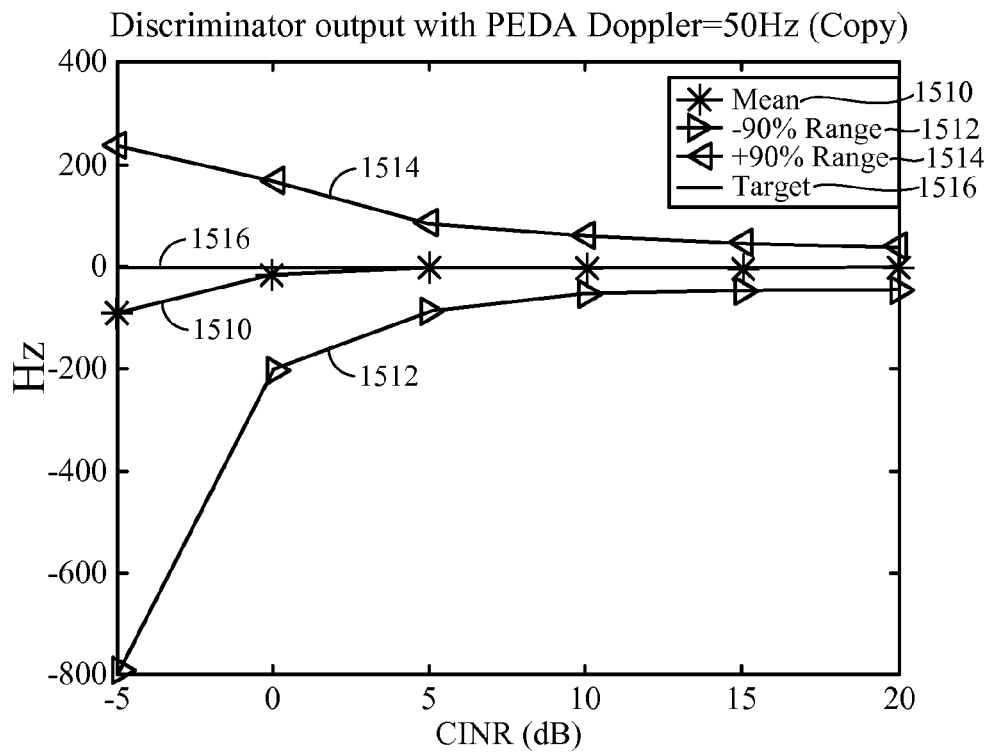
FIGS. 15A-15B illustrate output statistics of the frequency tracking discriminator output with the copy-based pilot interpolation in Pedestrian A channel for Doppler frequencies of 50 Hz and 300 Hz, respectively in accordance with certain embodiments of the present disclosure.
Figure 15B:
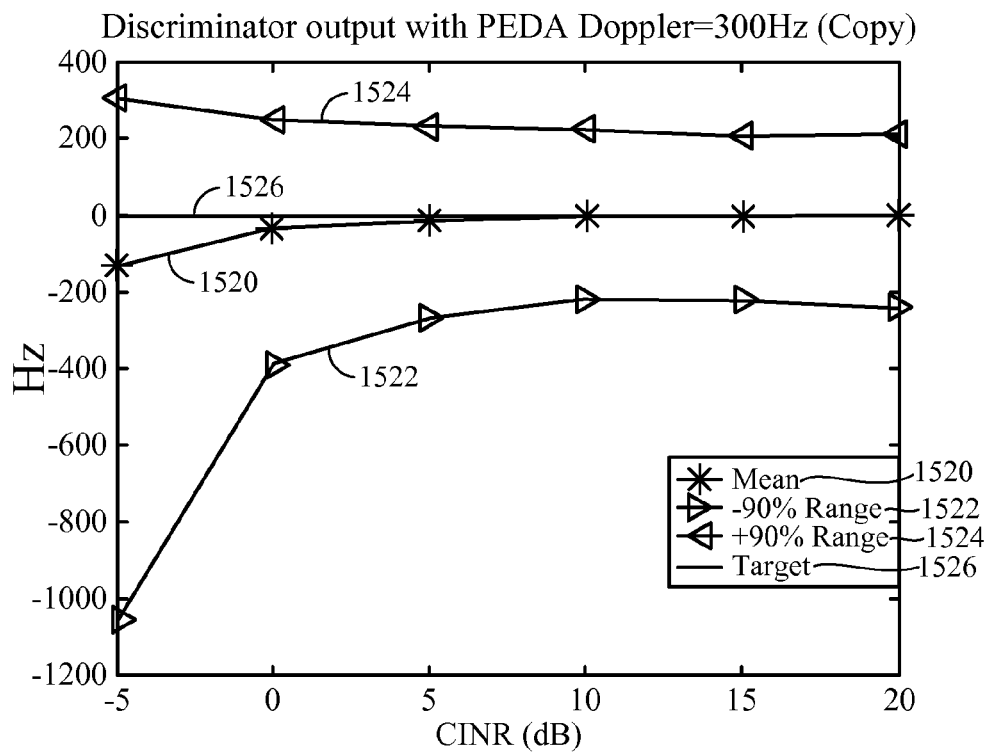
Figure 16A:
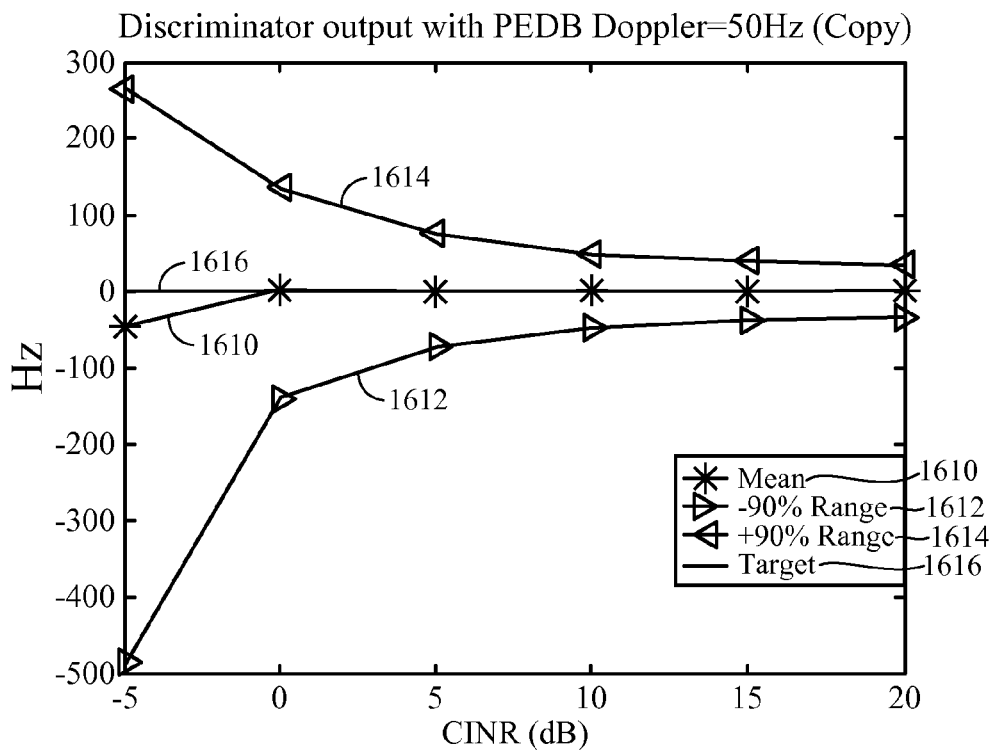
FIGS. 16A-16B illustrate output statistics of the frequency tracking discriminator with the copy-based pilot interpolation in Pedestrian B channel for Doppler frequencies of 50 Hz and 300 Hz, respectively in accordance with certain embodiments of the present disclosure.
Figure 16B:
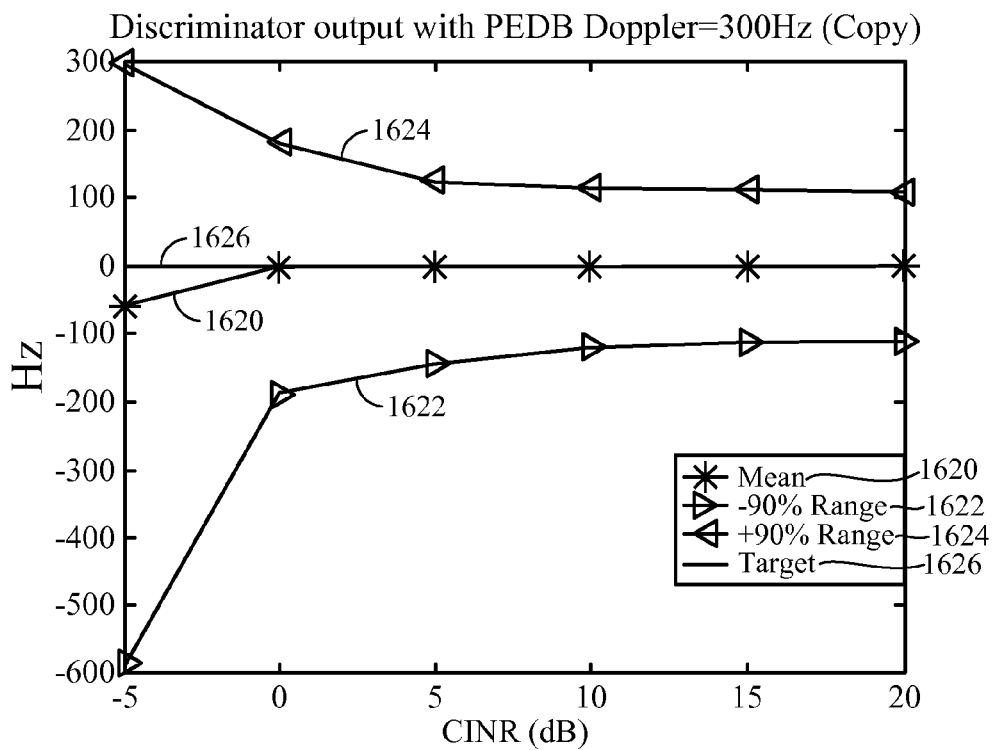
Figure 17A:
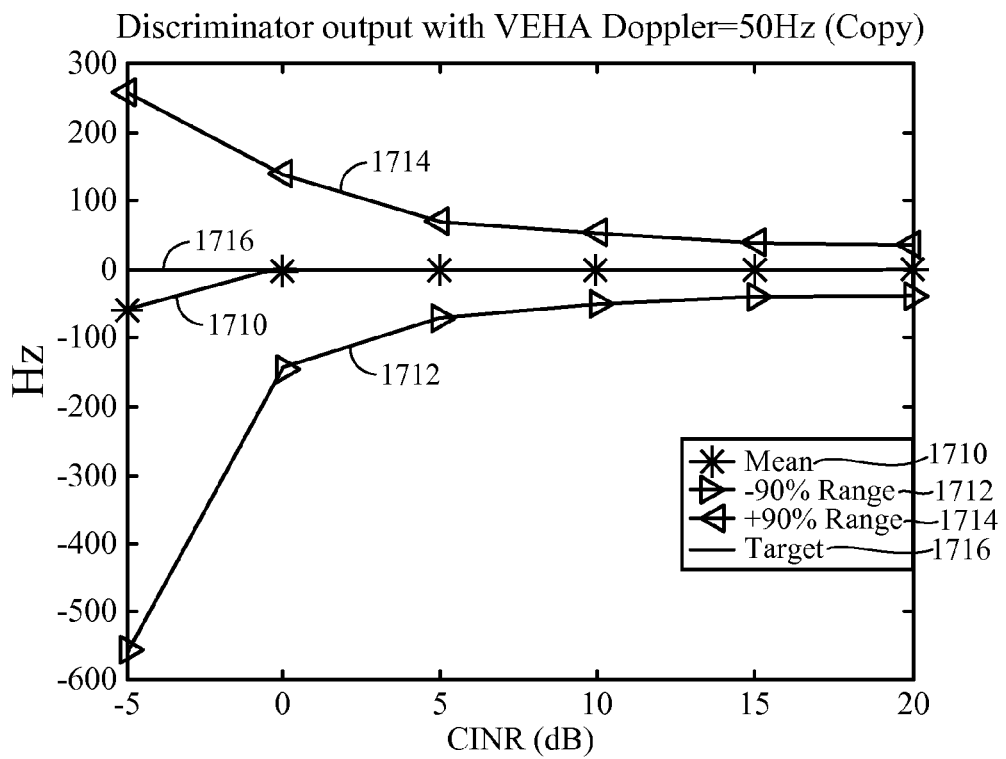
FIGS. 17A-17B illustrate output statistics of the frequency tracking discriminator with the copy-based pilot interpolation in Vehicular A channel for Doppler frequencies of 50 Hz and 300 Hz, respectively in accordance with certain embodiments of the present disclosure.
Figure 17B:
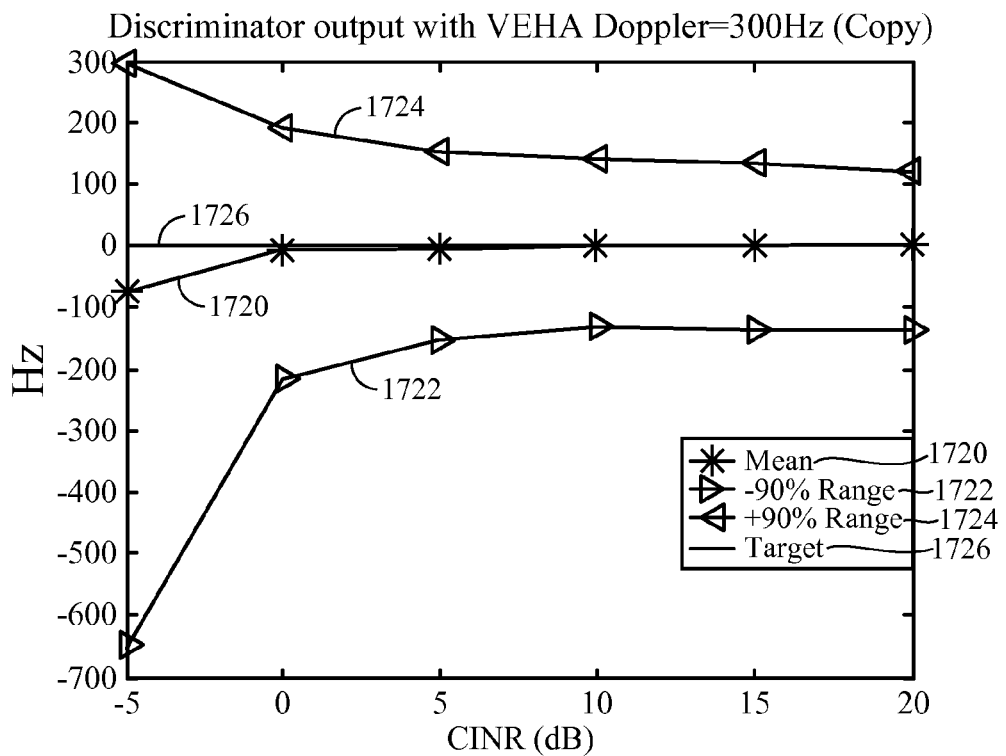
Figure 18A:
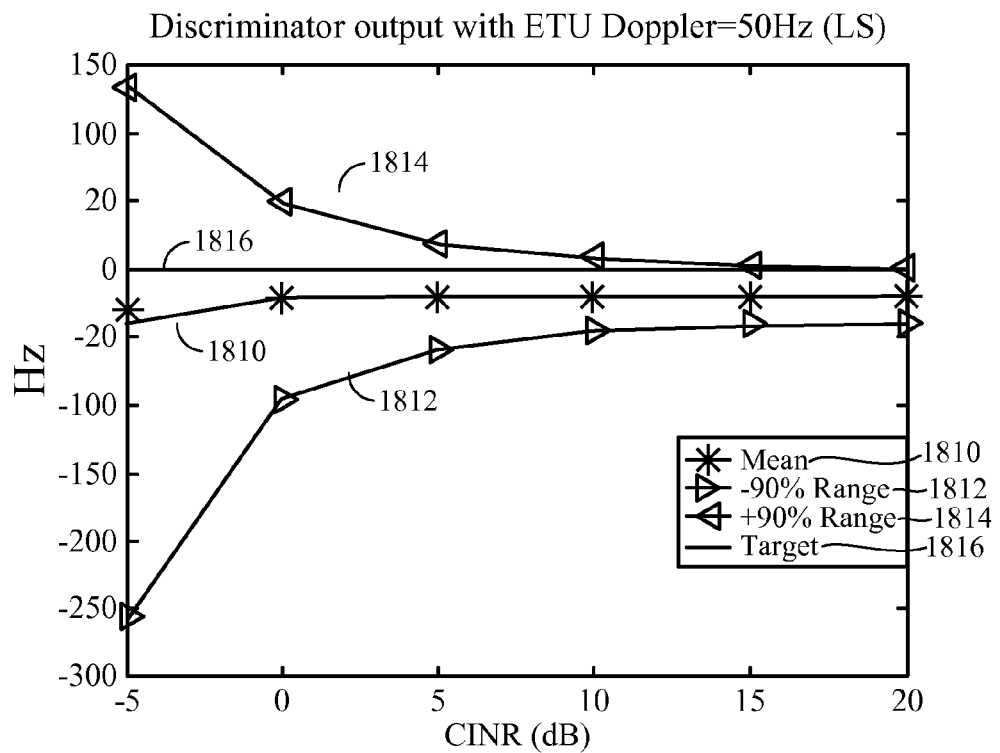
FIGS. 18A-18B illustrate output statistics of the frequency tracking discriminator with the least squares (LS) based pilot interpolation output in ETU channel for Doppler frequencies of 50 Hz and 300 Hz, respectively in accordance with certain embodiments of the present disclosure.
Figure 18B:
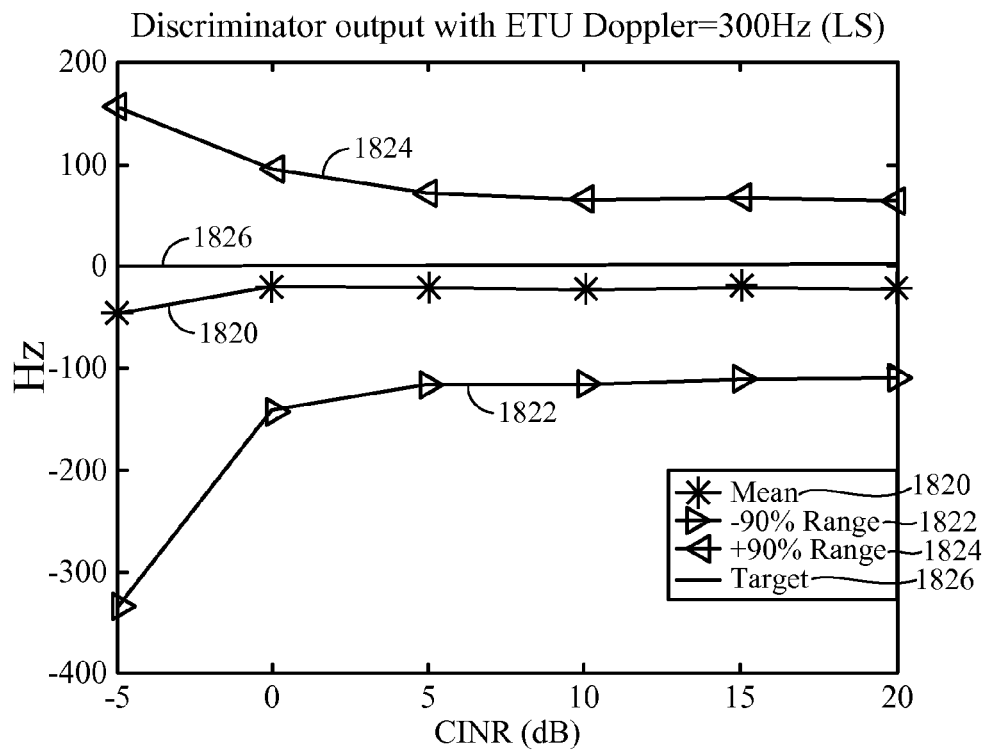
Figure 19A:
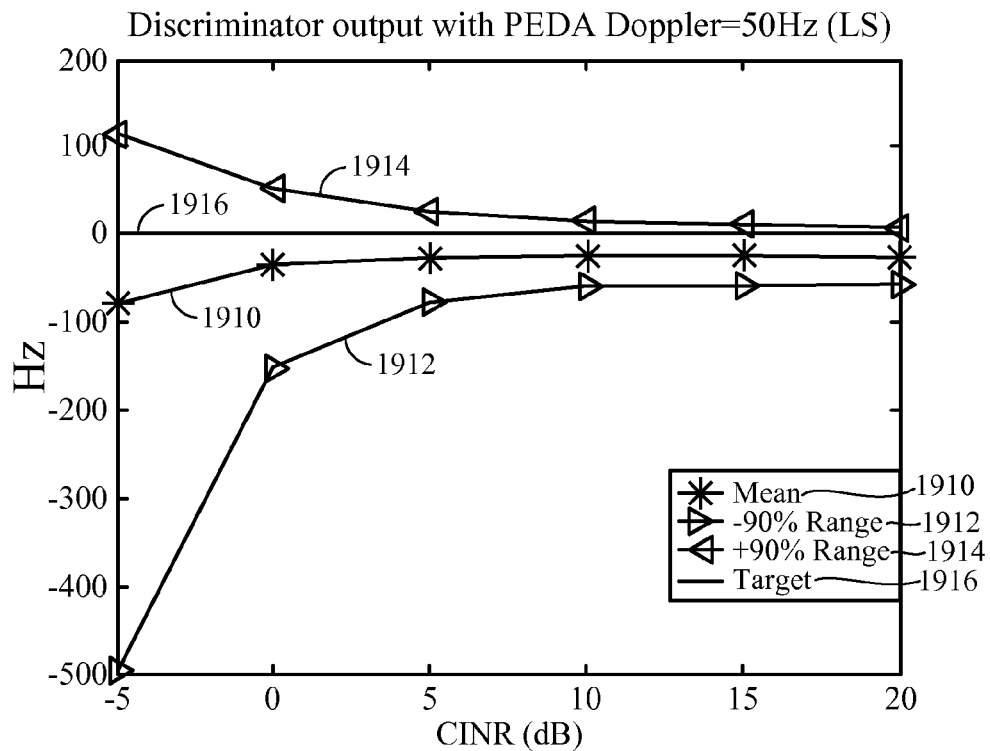
FIGS. 19A-19B illustrate output statistics of the frequency tracking discriminator with the LS-based pilot interpolation in Pedestrian A channel for Doppler frequencies of 50 Hz and 300 Hz, respectively in accordance with certain embodiments of the present disclosure.
Figure 19B:
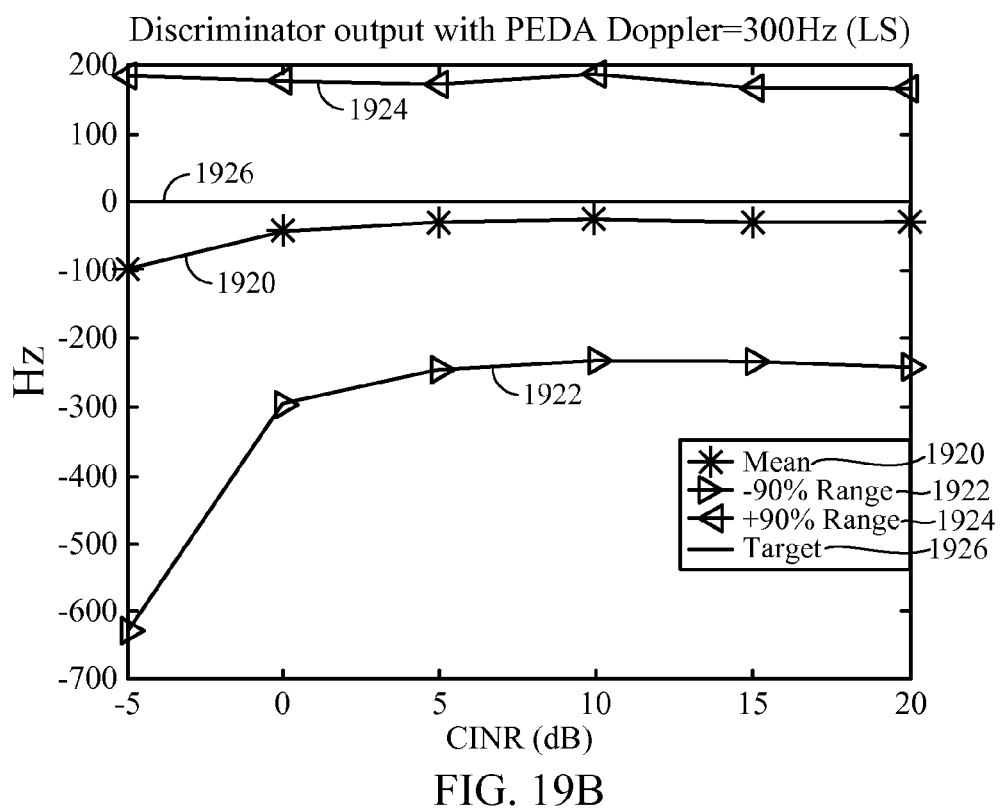
Figure 20A:
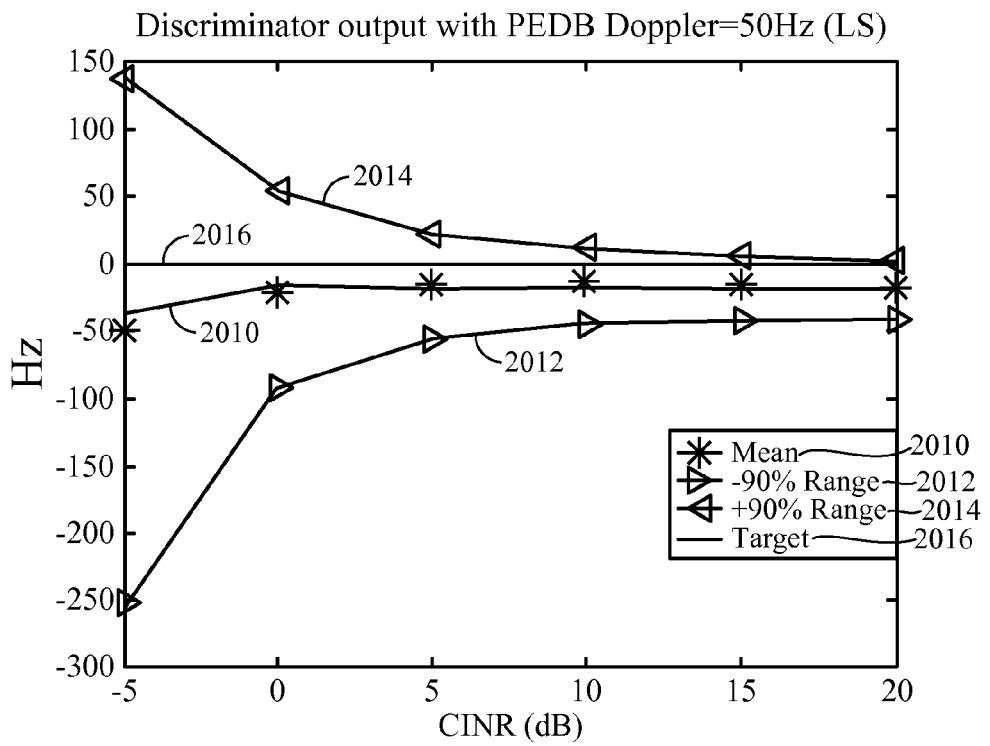
FIGS. 20A-20B illustrate output statistics of the frequency tracking discriminator with the LS-based pilot interpolation in Pedestrian B channel for Doppler frequencies of 50 Hz and 300 Hz, respectively in accordance with certain embodiments of the present disclosure.
Figure 20B:
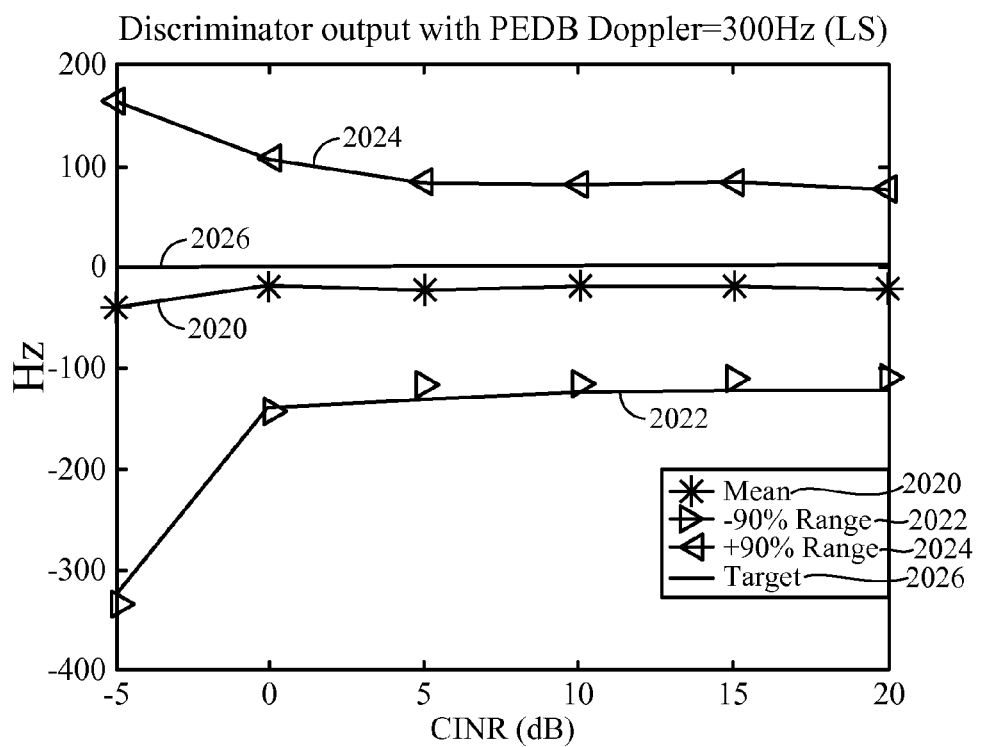
Figure 21A:
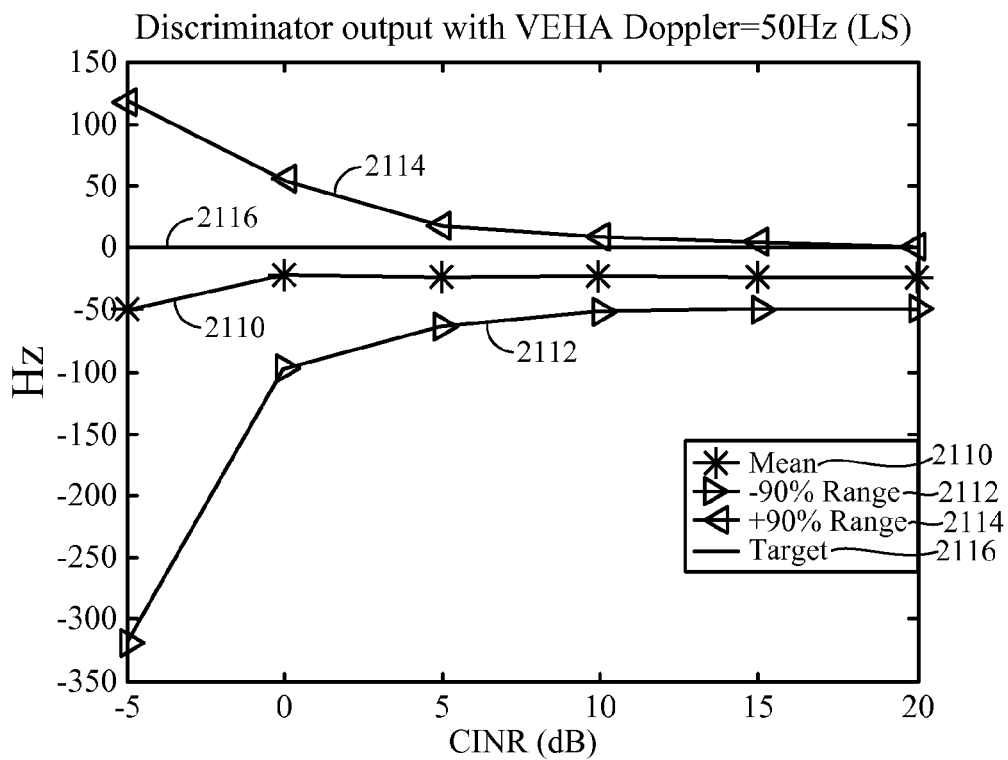
FIGS. 21A-21B illustrate output statistics of the frequency tracking discriminator with the LS-based pilot interpolation in Vehicular A channel for Doppler frequencies of 50 Hz and 300 Hz, respectively in accordance with certain embodiments of the present disclosure.
Figure 21B:
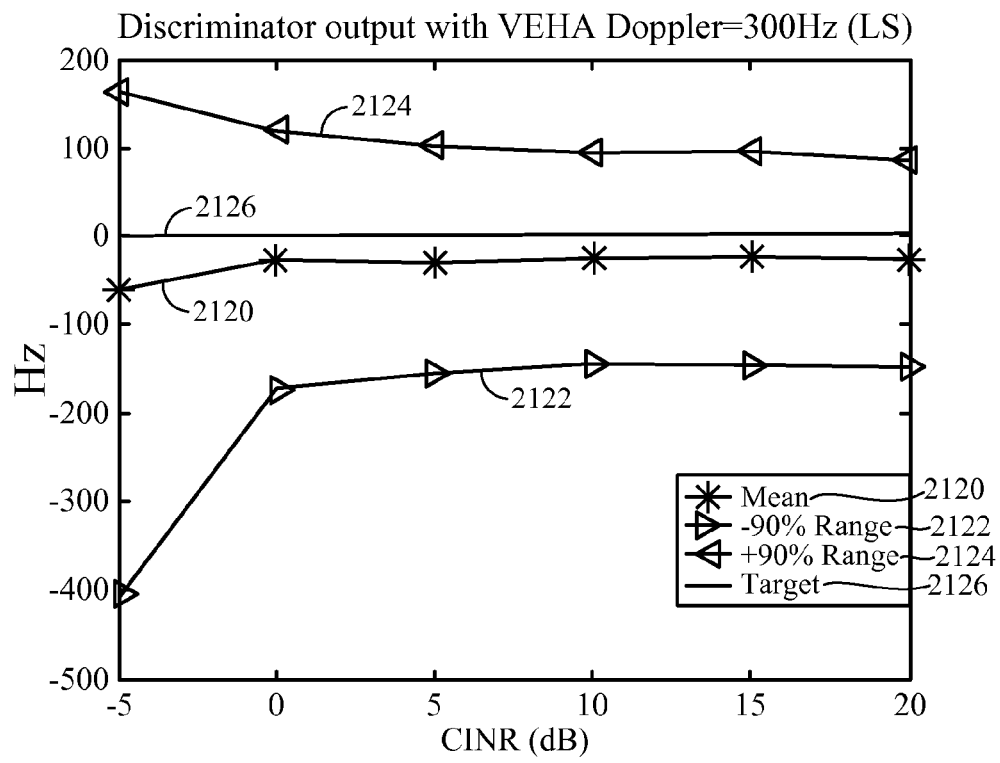

A mean value of the frequency offset discriminator output and ±90% range are plotted. Plotted 90% range means that 90% of samples that are greater than the mean value may be upper-bounded by the corresponding plots in FIGS. 14A-21B (i.e., plots 1414, 1424, 1514, 1524, 1614, 1624, 1714, 1724, 1814, 1824, 1914, 1924, 2014, 2024, 2114, 2124, respectively), while 90% of samples that are smaller than the mean are lower-bounded by the corresponding plots in FIGS. 14A-21B (i.e., plots 1412, 1422, 1512, 1522, 1612, 1622, 1712, 1722, 1812, 1822, 1912, 1922, 2012, 2022, 2112, 2122, respectively). According to simulation results, the worst case may happen in the Pedestrian A channel with Doppler frequency of 300 Hz, as illustrated in FIG. 15B. According to simulation results, for the acceptable CINR loss of 0.05 dB, the upper bound for the loop gain $\alpha$ may be $\alpha_{up}=\frac{1}{4}$.

Figure 22A:
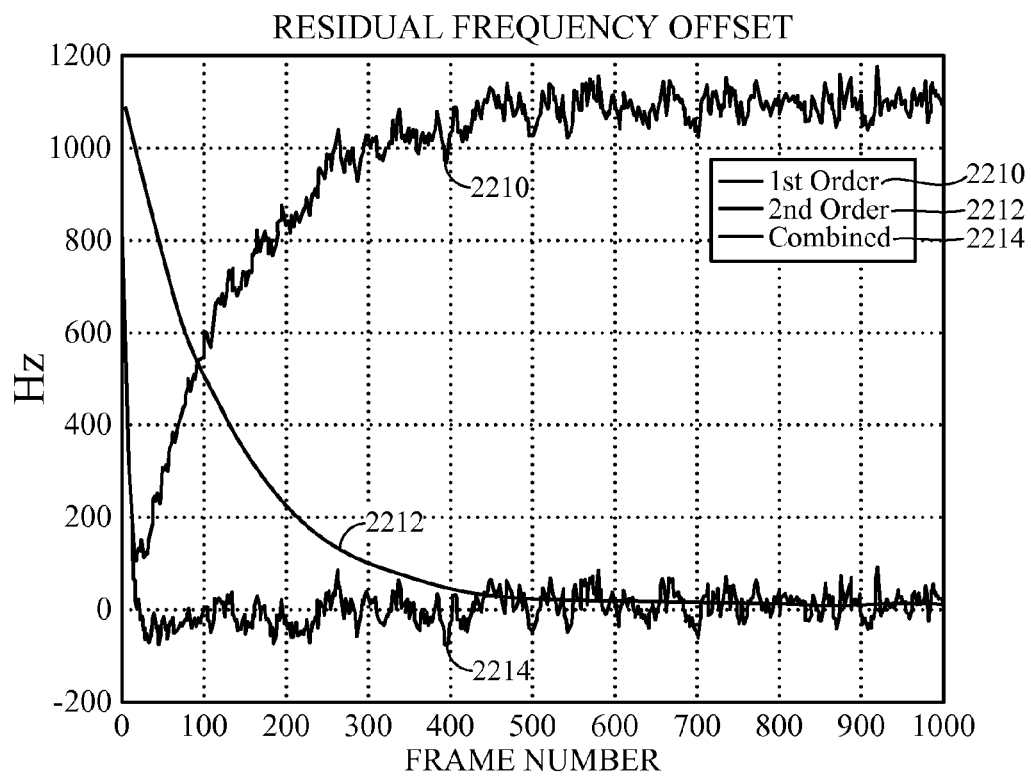
FIGS. 22A-22B illustrate residual frequency offsets for different gains of frequency tracking loops in accordance with certain embodiments of the present disclosure.
Figure 22B:
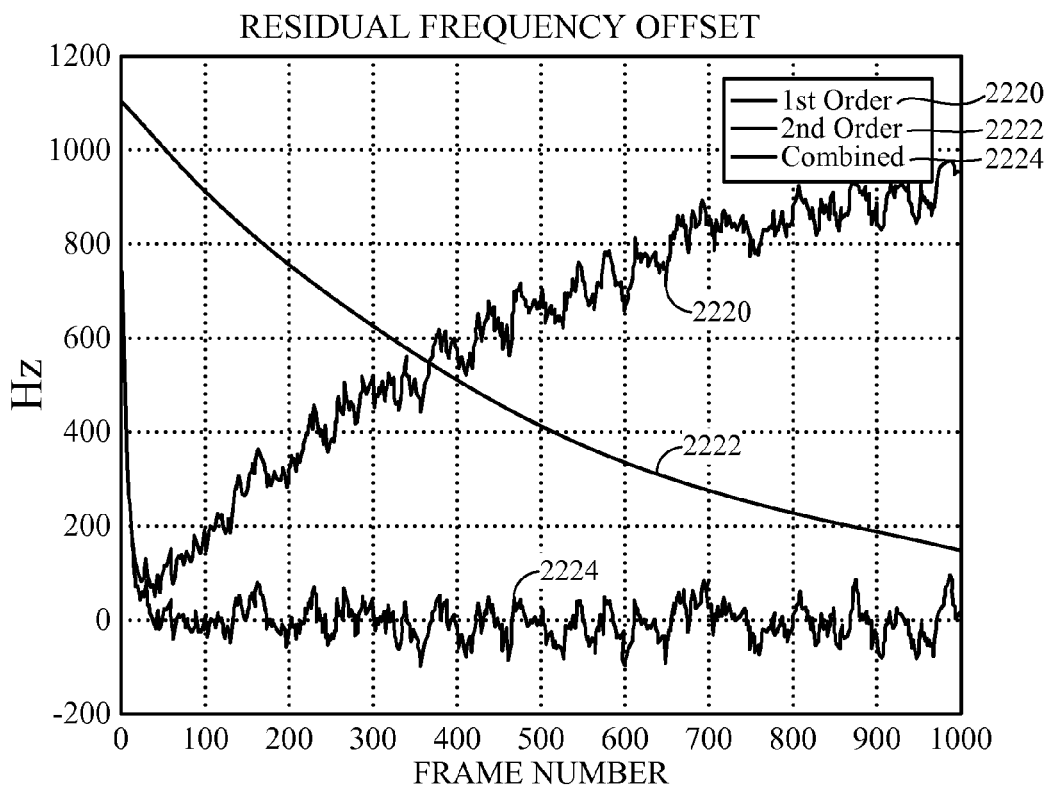

FIG. 22A and FIG. 22B illustrate a residual frequency offset for the FTL of the first order (i.e., plots 2210 and 2220 in FIG. 22A and FIG. 22B, respectively), and for the FTL of the second order (i.e., plots 2212 and 2222 in FIG. 22A and FIG. 22B, respectively). A combined residual frequency offset is given by plots 2214 and 2224 in FIG. 22A and FIG. 22B, respectively. The loop gains are set to $\alpha=\frac{1}{8}$ and $\beta=\frac{1}{128}$ in FIG. 22A, and to $\alpha=\frac{1}{8}$ and $\beta=\frac{1}{512}$ in FIG. 22B. The AWGN channel is assumed for both cases, the input CINR is equal to −5 dB, and the normalized frequency error is equal to 0.1. It can be observed from FIGS. 22A-22B that combining the FTL of the first order with the FTL of the second order may provide excellent performance regarding the residual frequency offset, especially when $\alpha=\frac{1}{8}$ and $\beta=\frac{1}{512}$.

According to simulation results, there is a frequency offset estimation bias of about 0.2% due to the LS-based interpolation and due to the pilot-based correlation between the preamble and pilot symbols of the 1st PUSC zone. In order to avoid the bias, the discriminator based on the copy-based interpolation together with the second order FTL structure can be proposed for the FTL implementation. It is also shown that the FTL gain $\alpha=\frac{1}{8}$ can meet the requirement for the CINR loss that is less than 0.05 dB. Corresponding to the multi-mode design requirement and the oscillator characteristics due to the temperature change, the gain FTL gain $\beta$ can be either $\frac{1}{128}$, $\frac{1}{256}$ or $\frac{1}{512}$.

Figure 8A:
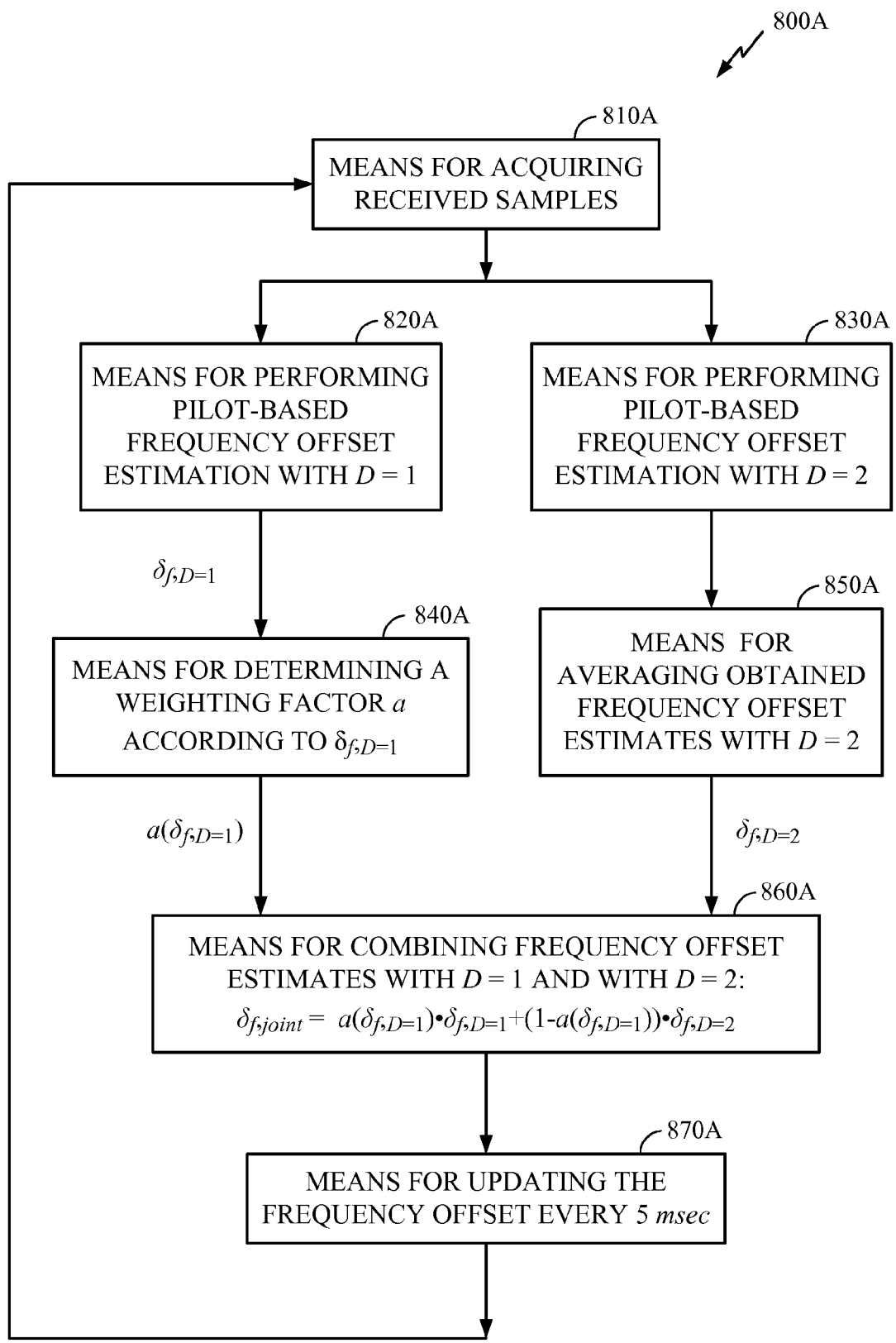
FIG. 8A illustrates example components capable of performing the operations illustrated in FIG. 8.

The various operations of methods described above may be performed by various hardware and/or software component(s) and/or module(s) corresponding to means-plus-function blocks illustrated in the Figures. For example, blocks 810-870 illustrated in FIG. 8 correspond to means-plus-function blocks 810A-870A illustrated in FIG. 8A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for a wireless communication system comprises:
   correlating pilots from a pair of consecutive symbols with same pilot pattern to obtain a first estimated value of a frequency offset;
   determining a weighting factor based on the first estimated value of the frequency offset;
   correlating pilots from one or more pair of symbols with same pilot pattern to obtain a set of estimated values of the frequency offset, where symbols in each pair are spaced apart by at least one symbol period;
   averaging estimated values of the frequency offset from the set of estimated values to obtain a second estimated value of the frequency offset; and
   computing a third estimated value of the frequency offset by using the first estimated value of frequency offset, the second estimated value of frequency offset and the weighting factor.

2. The method of claim 1, wherein one symbol from the pair of consecutive symbols is a preamble symbol.

3. The method of claim 1, wherein one symbol from the pair of consecutive symbols is an Orthogonal Frequency Division Multiplexing (OFDM) symbol of the 1st Partially Used Sub-carrier (PUSC) zone.

4. The method of claim 1, wherein all symbols used to obtain the set of estimated values of the frequency offset are Orthogonal Frequency Division Multiplexing (OFDM) symbols of the 1st Partially Used Sub-carrier (PUSC) zone.

5. The method of claim 1, wherein one symbol from the plurality of symbols used to obtain the set of estimated values of the frequency offset is a preamble symbol, and other symbols are Orthogonal Frequency Division Multiplexing (OFDM) symbols of the 1st Partially Used Sub-carrier (PUSC) zone.

6. The method of claim 1, further comprising:
   interpolating pilots in the preamble symbol by copying channel responses to appropriate frequency bins from its nearest pilot positions.

7. The method of claim 1, further comprising:
   interpolating pilots in the preamble symbol according to the least squares algorithm.

8. The method of claim 1, wherein computing the third estimated value of the frequency offset is a part of a first loop.

9. The method of claim 8, further comprising:
   determining an upper bound of a gain of the first loop such that a predefined value of a Carrier-to-Interference-plus-Noise Ratio (CINR) loss due to the frequency offset is achieved; and
   determining a lower bound of the gain of the first loop such that the frequency offset is estimated at a predefined rate.

10. The method of claim 8, wherein computing the third estimated value of the frequency offset is a part of a second loop.

11. The method of claim 10, further comprising:
    determining a first gain and a second gain of the second loop such that a maximum frequency drift due to temperature change of used circuitry is estimated and such that an impulse response of the second loop is stable.

12. The method of claims 10, further comprising:
    combining the first loop with the second loop to obtained a combined loop.

13. An apparatus for a wireless communication system comprises:
- logic for correlating pilots from a pair of consecutive symbols with same pilot pattern to obtain a first estimated value of a frequency offset;
- logic for determining a weighting factor based on the first estimated value of the frequency offset;
- logic for correlating pilots from one or more pair of symbols with same pilot pattern to obtain a set of estimated values of the frequency offset, where symbols in each pair are spaced apart by at least one symbol period;
- logic for averaging estimated values of the frequency offset from the set of estimated values to obtain a second estimated value of the frequency offset; and
- logic for computing a third estimated value of the frequency offset by using the first estimated value of frequency offset, the second estimated value of frequency offset and the weighting factor.

14. The apparatus of claim 13, wherein one symbol from the pair of consecutive symbols is a preamble symbol.

15. The apparatus of claim 13, wherein one symbol from the pair of consecutive symbols is an Orthogonal Frequency Division Multiplexing (OFDM) symbol of the 1st Partially Used Sub-carrier (PUSC) zone.

16. The apparatus of claim 13, wherein all symbols used to obtain the set of estimated values of the frequency offset are Orthogonal Frequency Division Multiplexing (OFDM) symbols of the 1st Partially Used Sub-carrier (PUSC) zone.

17. The apparatus of claim 13, wherein one symbol from the plurality of symbols used to obtain the set of estimated values of the frequency offset is a preamble symbol, and other symbols are Orthogonal Frequency Division Multiplexing (OFDM) symbols of the 1st Partially Used Sub-carrier (PUSC) zone.

18. The apparatus of claim 13, further comprising:
- logic for interpolating pilots in the preamble symbol by copying channel responses to appropriate frequency bins from its nearest pilot positions.

19. The apparatus of claim 13, further comprising:
- logic for interpolating pilots in the preamble symbol according to the least squares algorithm.

20. The apparatus of claim 13, wherein the logic for computing the third estimated value of the frequency offset is a part of a first loop.

21. The apparatus of claim 20, further comprising:
- logic for determining an upper bound of a gain of the first loop such that a predefined value of a Carrier-to-Interference-plus-Noise Ratio (CINR) loss due to the frequency offset is achieved; and
- logic for determining a lower bound of the gain of the first loop such that the frequency offset is estimated at a predefined rate.

22. The apparatus of claim 20, wherein the logic for computing the third estimated value of the frequency offset is a part of a second loop.

23. The apparatus of claim 22, further comprising:
- logic for determining a first gain and a second gain of the second loop such that a maximum frequency drift due to temperature change of used circuitry is estimated and such that an impulse response of the second loop is stable.

24. The apparatus of claims 22, further comprising:
- logic for combining the first loop with the second loop to obtained a combined loop.

25. An apparatus for a wireless communication system comprises:
- means for correlating pilots from a pair of consecutive symbols with same pilot pattern to obtain a first estimated value of a frequency offset;
- means for determining a weighting factor based on the first estimated value of the frequency offset;
- means for correlating pilots from one or more pair of symbols with same pilot pattern to obtain a set of estimated values of the frequency offset, where symbols in each pair are spaced apart by at least one symbol period;
- means for averaging estimated values of the frequency offset from the set of estimated values to obtain a second estimated value of the frequency offset; and
- means for computing a third estimated value of the frequency offset by using the first estimated value of frequency offset, the second estimated value of frequency offset and the weighting factor.

26. The apparatus of claim 25, wherein one symbol from the pair of consecutive symbols is a preamble symbol.

27. The apparatus of claim 25, wherein one symbol from the pair of consecutive symbols is an Orthogonal Frequency Division Multiplexing (OFDM) symbol of the 1st Partially Used Sub-carrier (PUSC) zone.

28. The apparatus of claim 25, wherein all symbols used to obtain the set of estimated values of the frequency offset are Orthogonal Frequency Division Multiplexing (OFDM) symbols of the 1st Partially Used Sub-carrier (PUSC) zone.

29. The apparatus of claim 25, wherein one symbol from the plurality of symbols used to obtain the set of estimated values of the frequency offset is a preamble symbol, and other symbols are Orthogonal Frequency Division Multiplexing (OFDM) symbols of the 1st Partially Used Sub-carrier (PUSC) zone.

30. The apparatus of claim 25, further comprising:
- means for interpolating pilots in the preamble symbol by copying channel responses to appropriate frequency bins from its nearest pilot positions.

31. The apparatus of claim 25, further comprising:
- means for interpolating pilots in the preamble symbol according to the least squares algorithm.

32. The apparatus of claim 25, wherein the means for computing the third estimated value of the frequency offset is a part of a first loop.

33. The apparatus of claim 32, further comprising:
- means for determining an upper bound of a gain of the first loop such that a predefined value of a Carrier-to-Interference-plus-Noise Ratio (CINR) loss due to the frequency offset is achieved; and
- means for determining a lower bound of the gain of the first loop such that the frequency offset is estimated at a predefined rate.

34. The apparatus of claim 32, wherein the means for computing the third estimated value of the frequency offset is a part of a second loop.

35. The apparatus of claim 34, further comprising:
- means for determining a first gain and a second gain of the second loop such that a maximum frequency drift due to temperature change of used circuitry is estimated and such that an impulse response of the second loop is stable.

36. The apparatus of claims 34, further comprising:
- means for combining the first loop with the second loop to obtained a combined loop.

37. A computer-program product for a wireless communication system, comprising a non-transitory computer-readable medium having instructions stored thereon, the instructions being executable by one or more processors and the instructions comprising:

instructions for correlating pilots from a pair of consecutive symbols with same pilot pattern to obtain a first estimated value of a frequency offset;

instructions for determining a weighting factor based on the first estimated value of the frequency offset;

instructions for correlating pilots from one or more pair of symbols with same pilot pattern to obtain a set of estimated values of the frequency offset, where symbols in each pair are spaced apart by at least one symbol period;

instructions for averaging estimated values of the frequency offset from the set of estimated values to obtain a second estimated value of the frequency offset; and instructions for computing a third estimated value of the frequency offset by using the first estimated value of frequency offset, the second estimated value of frequency offset and the weighting factor.

38. The computer-program product of claim 37, wherein one symbol from the pair of consecutive symbols is a preamble symbol.

39. The computer-program product of claim 37, wherein one symbol from the pair of consecutive symbols is an Orthogonal Frequency Division Multiplexing (OFDM) symbol of the 1st Partially Used Sub-carrier (PUSC) zone.

40. The computer-program product of claim 37, wherein all symbols used to obtain the set of estimated values of the frequency offset are Orthogonal Frequency Division Multiplexing (OFDM) symbols of the 1st Partially Used Sub-carrier (PUSC) zone.

41. The computer-program product of claim 37, wherein one symbol from the plurality of symbols used to obtain the set of estimated values of the frequency offset is a preamble symbol, and other symbols are Orthogonal Frequency Division Multiplexing (OFDM) symbols of the 1st Partially Used Sub-carrier (PUSC) zone.

42. The computer-program product of claim 37, wherein instructions further comprise:

instructions for interpolating pilots in the preamble symbol by copying channel responses to appropriate frequency bins from its nearest pilot positions.

43. The computer-program product of claim 37, wherein instructions further comprise:

instructions for interpolating pilots in the preamble symbol according to the least squares algorithm.

44. The computer-program product of claim 37, wherein the instructions for computing the third estimated value of the frequency offset are part of a first loop.

45. The computer-program product of claim 44, wherein instructions further comprise:

instructions for determining an upper bound of a gain of the first loop such that a predefined value of a Carrier-to-Interference-plus-Noise Ratio (CINR) loss due to the frequency offset is achieved; and instructions for determining a lower bound of the gain of the first loop such that the frequency offset is estimated at a predefined rate.

46. The computer-program product of claim 44, wherein the instructions for computing the third estimated value of the frequency offset are part of a second loop.

47. The computer-program product of claim 46, wherein instructions further comprise:

instructions for determining a first gain and a second gain of the second loop such that a maximum frequency drift due to temperature change of used circuitry is estimated and such that an impulse response of the second loop is stable.

48. The computer-program product of claims 46, wherein instructions further comprise:

instructions for combining the first loop with the second loop to obtained a combined loop.

* * * * *